US012455065B2

(12) United States Patent
Wells et al.

(10) Patent No.: US 12,455,065 B2
(45) Date of Patent: Oct. 28, 2025

(54) WORK LIGHT

(71) Applicant: MILWAUKEE ELECTRIC TOOL CORPORATION, Brookfield, WI (US)

(72) Inventors: Andrew C. Wells, Milwaukee, WI (US); Chelsea L. Rubietta, Loveland, OH (US); Gregory A. Mutchler, Milwaukee, WI (US); Bennett H. Speaks, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/811,901

(22) Filed: Aug. 22, 2024

(65) Prior Publication Data

US 2025/0067421 A1 Feb. 27, 2025

Related U.S. Application Data

(60) Provisional application No. 63/582,870, filed on Sep. 15, 2023, provisional application No. 63/578,681, filed on Aug. 25, 2023.

(51) Int. Cl.

| | |
|---|---|
| ***F21V 21/088*** | (2006.01) |
| ***F21L 4/00*** | (2006.01) |
| ***F21V 19/02*** | (2006.01) |
| ***F21V 21/096*** | (2006.01) |
| ***F21V 21/40*** | (2006.01) |

(52) U.S. Cl.

CPC ............ *F21V 21/0885* (2013.01); *F21L 4/00* (2013.01); *F21V 19/02* (2013.01); *F21V 21/0965* (2013.01); *F21V 21/406* (2013.01)

(58) Field of Classification Search

CPC .................................................. F21V 21/0885

See application file for complete search history.

(56) References Cited

U.S. PATENT DOCUMENTS

| | | | |
|---|---|---|---|
| 2,034,913 | A | 3/1936 | Kros |
| 2,510,772 | A | 6/1950 | Cahn |
| 2,727,137 | A | 12/1955 | Oharenko |

(Continued)

FOREIGN PATENT DOCUMENTS

| | | | |
|---|---|---|---|
| CN | 201351818 | Y | 11/2009 |
| CN | 203463961 | U | 3/2014 |

(Continued)

*Primary Examiner* — Sean P Gramling

(74) *Attorney, Agent, or Firm* — Michael Best & Friedrich LLP

(57) ABSTRACT

A work light includes a housing having a first housing portion and a second housing portion, a lighting unit coupled to the first housing portion and configured to move, and a clamp mechanism. A battery receptacle is coupled to the housing and is configured to receive a battery that provides power to the lighting unit for illuminating a work area. The clamp mechanism is configured to secure the work light in a location on or adjacent to the work area. The clamp mechanism includes a first jaw formed on the first housing portion, a second jaw formed on the second housing portion, and a hinge that biases the first housing portion relative to the second housing portion. A handle extending from the first housing portion is graspable to move the first housing portion relative to the second housing portion against a bias of the hinge to open the clamp mechanism.

18 Claims, 11 Drawing Sheets

(56) References Cited

U.S. PATENT DOCUMENTS

| | | | |
|---|---|---|---|
| 3,479,500 | A | 11/1969 | Duddy |
| 3,872,428 | A | 3/1975 | Boisvert |
| 4,654,764 | A | 3/1987 | Hsiao |
| 4,678,153 | A | 7/1987 | Maddock et al. |
| D348,743 | S | 7/1994 | Leen et al. |
| D360,952 | S | 8/1995 | Lee |
| 5,448,463 | A | 9/1995 | Leen |
| 5,464,182 | A | 11/1995 | Stekelenburg |
| 5,510,970 | A | 4/1996 | Hollenbach et al. |
| 5,548,496 | A | 8/1996 | Hart et al. |
| D375,377 | S | 11/1996 | Leen |
| D408,091 | S | 4/1999 | Joyner et al. |
| 5,993,022 | A | 11/1999 | Neyer et al. |
| 6,585,400 | B2 | 7/2003 | Leen |
| D481,606 | S | 11/2003 | Ben-Gigi |
| 6,764,194 | B1 | 7/2004 | Cooper |
| 7,175,318 | B2 | 2/2007 | Booty, Jr. |
| 7,318,657 | B2 | 1/2008 | Booty, Jr. |
| 7,357,540 | B2 | 4/2008 | Booty, Jr. |
| 7,390,105 | B2 | 6/2008 | Nelson et al. |
| 7,674,002 | B1 | 3/2010 | Wang |
| 7,686,467 | B2 | 3/2010 | Nelson et al. |
| 7,703,952 | B2 | 4/2010 | Yoon |
| 7,850,329 | B2 | 12/2010 | Henry et al. |
| 8,025,420 | B2 | 9/2011 | Henry et al. |
| 8,262,246 | B2 | 9/2012 | Pelletier et al. |
| 8,317,355 | B1 | 11/2012 | Wang |
| 8,348,454 | B2 | 1/2013 | Henry et al. |
| 8,376,569 | B2 | 2/2013 | Pelletier et al. |
| 8,506,111 | B2 | 8/2013 | Woods |
| 8,579,478 | B2 | 11/2013 | Cristoforo |
| 8,714,769 | B2 | 5/2014 | Cristoforo |
| 8,840,264 | B2 | 9/2014 | Molina et al. |
| 9,194,547 | B2 | 11/2015 | Ancona et al. |
| D786,660 | S | 5/2017 | Cacciabeve |
| D795,684 | S | 8/2017 | Cacciabeve |
| D844,208 | S | 3/2019 | You |
| 10,352,537 | B2 | 7/2019 | Li |
| D856,565 | S | 8/2019 | Fang |
| D861,945 | S | 10/2019 | Fang |
| D882,838 | S | 4/2020 | Mao |
| 10,731,831 | B2 | 8/2020 | Chang et al. |
| D899,657 | S | 10/2020 | You |
| D904,662 | S | 12/2020 | Bao |
| 10,962,180 | B2 | 3/2021 | Cacciabeve |
| 11,125,421 | B2 | 9/2021 | Cacciabeve |
| 11,371,680 | B1 | 6/2022 | Rajasekaran |
| D957,711 | S | 7/2022 | Shen |
| D974,620 | S | 1/2023 | Cacciabeve |
| D1,010,895 | S | 1/2024 | Li |
| 2003/0227773 | A1 | 12/2003 | Yang |
| 2003/0231491 | A1 | 12/2003 | Shih |
| 2005/0128738 | A1 | 6/2005 | Parker et al. |
| 2009/0279290 | A1* | 11/2009 | Henry ................ F21V 21/0885 362/396 |
| 2009/0316420 | A1 | 12/2009 | Villecco |
| 2012/0176767 | A1 | 7/2012 | Whitfield et al. |
| 2014/0126192 | A1 | 5/2014 | Ancona et al. |
| 2017/0314769 | A1 | 11/2017 | Cacciabeve |
| 2018/0320867 | A1 | 11/2018 | Chang et al. |
| 2021/0156528 | A1 | 5/2021 | Wenzel et al. |
| 2024/0410556 | A1 | 12/2024 | Koebl et al. |
| 2025/0043943 | A1* | 2/2025 | Bao .......................... F21L 4/04 |
| 2025/0137619 | A1 | 5/2025 | Strommen et al. |

FOREIGN PATENT DOCUMENTS

| | | | |
|---|---|---|---|
| CN | 206430019 | U | 8/2017 |
| CN | 211059901 | U | 7/2020 |
| CN | 113063133 | A | 7/2021 |
| CN | 216131901 | U | 3/2022 |
| CN | 217057370 | U | 7/2022 |
| CN | 217540437 | U | 10/2022 |
| CN | 308778835 | | 8/2024 |
| CN | 119435529 | A | 2/2025 |
| WO | 2005105379 | A1 | 11/2005 |

* cited by examiner

WORK LIGHT

CROSS REFERENCE TO RELATED APPLICATIONS

The present application claims priority to U.S. Provisional Patent Application No. 63/582,870, filed Sep. 15, 2023, and U.S. Provisional Patent Application No. 63/578,681, filed Aug. 25, 2023, the entire contents of both of which are incorporated herein by reference.

FIELD OF INVENTION

The present disclosure relates to work lights, and more specifically, to work lights having a mechanism for securing the work light to a work surface or work piece.

SUMMARY

In one aspect, the disclosure provides a work light including a housing having a first housing portion and a second housing portion, a lighting unit coupled to the first housing portion and configured to move relative to the first housing portion, and a clamp mechanism. A battery receptacle is coupled to the housing and is configured to receive a battery that provides power to the lighting unit for illuminating a work area. The clamp mechanism is configured to secure the work light in a location on or adjacent to the work area. The clamp mechanism includes a first jaw formed on the first housing portion, a second jaw formed on the second housing portion, and a hinge that biases the first housing portion relative to the second housing portion. A handle extending from the first housing portion is graspable to move the first housing portion relative to the second housing portion against a bias of the hinge to open the clamp mechanism.

In another aspect, the disclosure provides a work light including a housing having a first housing portion and a second housing portion, a lighting unit coupled to the first housing portion and configured to move relative to the first housing portion, and a clamp mechanism. A battery receptacle is coupled to the housing and is configured to receive a battery that provides power to the lighting unit for illuminating a work area. The clamp mechanism is configured to secure the work light in a location on or adjacent to the work area. A handle extends from the second housing portion, at least a portion of the handle extending away from the first housing portion to provide clearance for the battery to be inserted into the battery receptacle.

In another aspect, the disclosure provides a work light including a housing having a first housing portion and a second housing portion, a lighting unit coupled to the first housing portion and configured to move relative to the first housing portion, and a clamp mechanism. A battery receptacle is coupled to the housing and is configured to receive a battery that provides power to the lighting unit for illuminating a work area. The clamp mechanism is configured to secure the work light in a location on or adjacent to the work area. The clamp mechanism includes a first jaw formed on the first housing portion, a second jaw formed on the second housing portion, and a hinge that pivotally couples the first housing portion to the second housing portion. The clamp mechanism includes a plurality of profiles configured to couple to a variety of support surfaces.

Other aspects of the disclosure will become apparent by consideration of the detailed description and the accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Additionally, before any embodiments of the invention are explained in detail, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Figure 1:
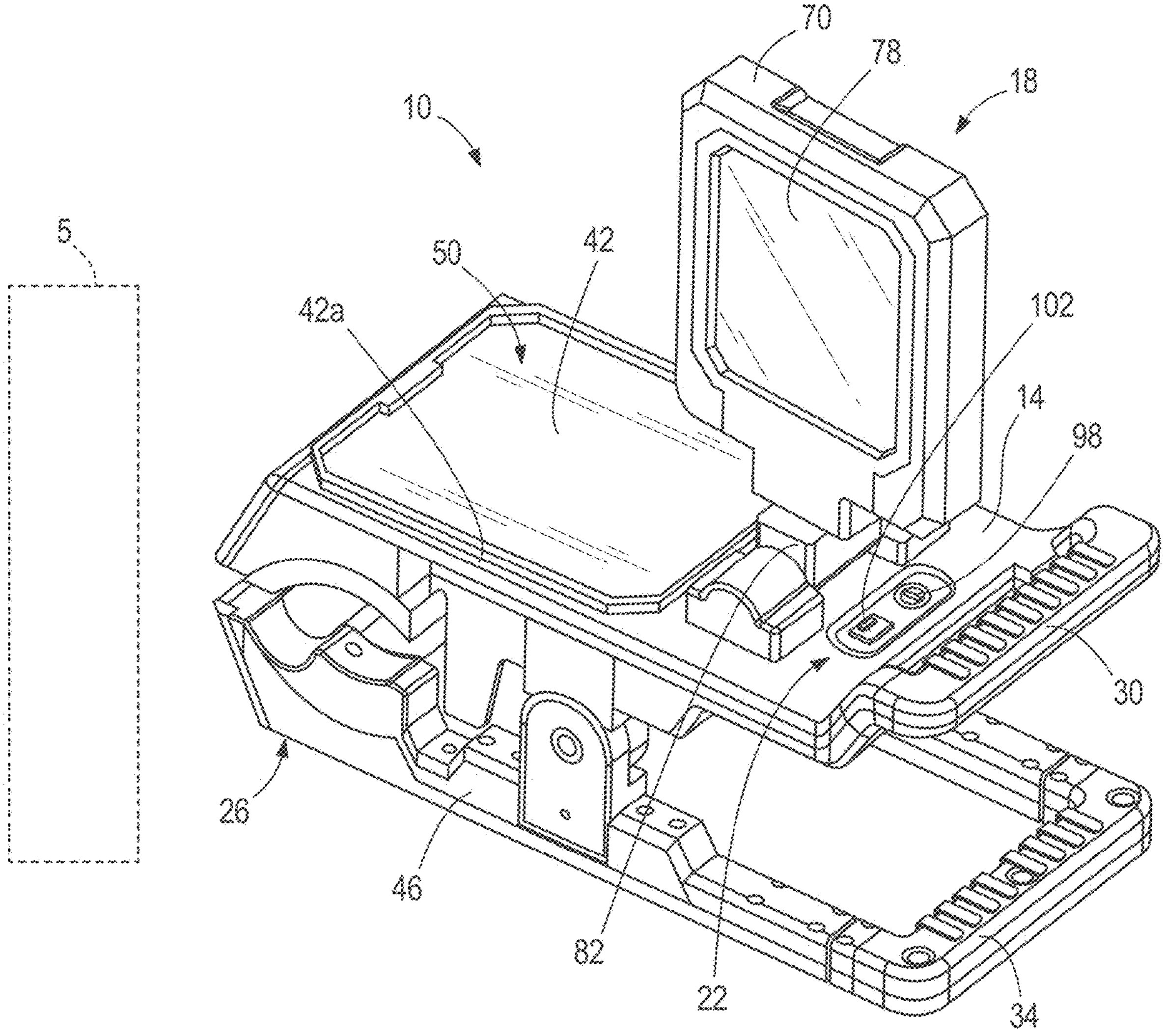
FIG. 1 is a rear perspective view of a work light including a housing, a lighting unit, and a clamping mechanism according to an embodiment of the disclosure.

FIG. 1 illustrates a work light 10. The work light 10 may also be referred to as a flood light 10. The flood light 10 is configured to be located on or adjacent to a work surface to provide illumination for a work area, such as an area 5. The flood light 10 is adjustable and is mountable in multiple orientations to provide illumination on the work area at different angles and from different heights.

Figure 2:
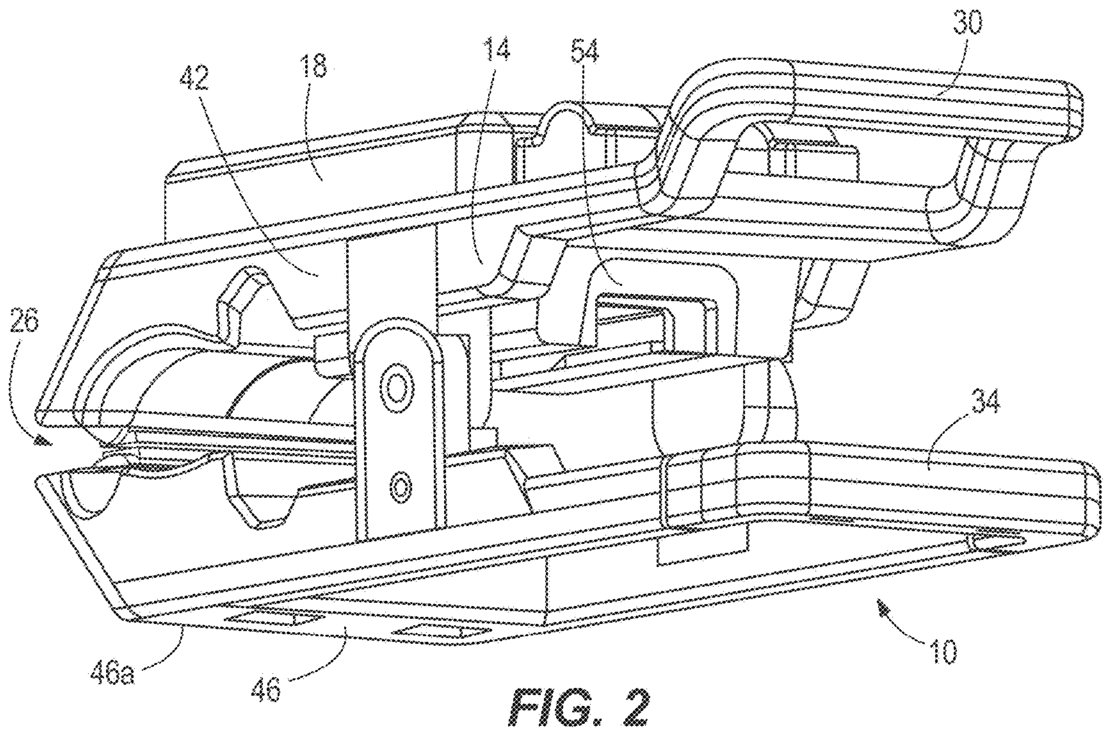
FIG. 2 is a bottom perspective of the work light with the lighting unit in a storage position.

As illustrated in FIGS. 1 and 2, the illustrated flood light 10 includes a housing 14, a lighting unit 18, a user interface 22, a clamp mechanism 26, a first handle 30, and a second handle 34. A battery 38 (FIG. 11) may be removably attached to the housing 14 for providing power to the lighting unit 18. The lighting unit 18 is movably (e.g., pivotably and/or rotationally) mounted to the housing 14 and is configured to illuminate a work area, such as the area 5, shown in FIG. 1. The housing 14 includes a first housing portion 42 and a second housing portion 46. In the illustrated embodiment, the first housing portion 42 and the second housing portion 46 are separately formed and pivotably coupled to each other. As such, the first housing portion 42 and the second housing portion 46 may pivot relative to one another about a pivot axis, as will be described in more detail. The clamp mechanism 26 is positioned at a first or front end of the flood light 10 and is operable for attaching and securing the flood light 10 on or adjacent to a work surface. In the illustrated embodiment, the clamp mechanism 26 is integrally formed with the housing 14. The clamp mechanism 26 is operable by grasping each of the first handle 30, positioned on the first housing portion 42, and the second handle 34, positioned on the second housing portion 46, to pivot the first housing portion 42 relative to the second housing portion 46 and actuate the clamp mechanism 26. The handles 30, 34 are positioned at a second or rearward end of the work light 10, opposite the clamp mechanism 26 at the first or front end of the flood light 10.

With continued reference to FIGS. 1 and 2, in the illustrated embodiment, the lighting unit 18 is coupled to the first housing portion 42. The lighting unit 18 is movably supported on the first housing portion 42 to direct the light and is movable to a storage position, shown in FIG. 2. The first housing portion 42 includes a lighting unit receptacle 50 for at least partially receiving the lighting unit 18 when the lighting unit 18 is in the storage position. In the illustrated embodiment, the lighting unit receptacle 50 is formed by a raised ridge extending from a top surface 42*a* of the first housing portion 42. In some embodiments, the lighting unit receptacle 50 may be additionally or alternatively recessed into the top surface 42*a*. In some embodiments, the lighting unit 18 may simply rest against the top surface 42*a* in the storage position.

With reference to FIG. 2, the first housing portion 42 further includes an interface 54 for coupling to a power source. In the illustrated embodiment, the interface 54 includes a battery receptacle 54 that receives and electrically connects the battery 38 (FIG. 11) to the lighting unit 18. The battery 38 may be, for example, a power tool battery pack. In some embodiments, the battery 38 may be an 18 volt Li-ion battery pack. In other embodiments, the battery 38 may have other voltages and/or chemistries. The battery receptacle 54 may include, for example, guide rails and electrical contacts for physically and electrically coupling the battery 38. The battery receptacle 54 is positioned on a side of the first housing portion 42 opposite from the lighting unit 18. Specifically, the battery receptacle 54 is positioned on the first housing portion 42 such that the battery 38, when coupled to the battery receptacle 54, is positioned between the first housing portion 42 and the second housing portion 46. In other words, the lighting unit 18 is coupled to a side of the first housing portion 42 that faces away from the second housing portion 46 (e.g., the top surface 42*a* of the first housing portion 42), and the battery receptacle 54 is positioned on a side of the first housing portion 42 that faces toward the second housing portion 46.

Figure 3:
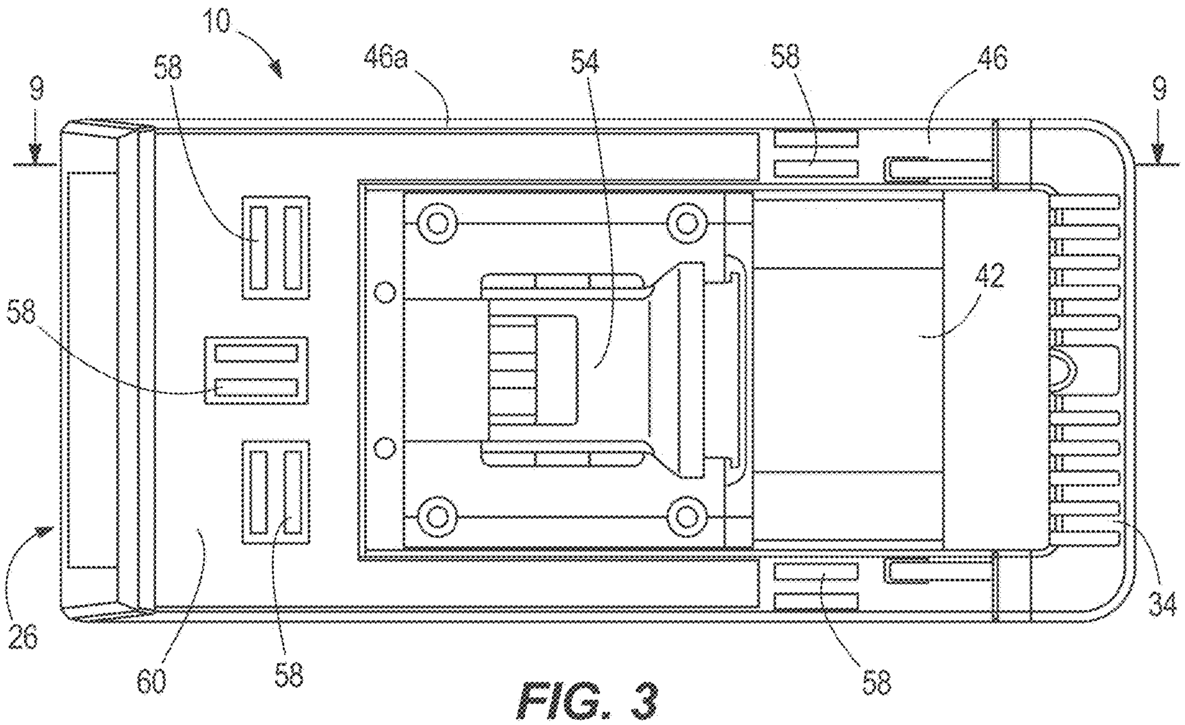
FIG. 3 is a bottom view of the work light of FIG. 1.

With reference to FIGS. 1 and 3, the second housing portion 46 includes a plurality of magnets 58. In some embodiments, the magnets 58 may be embedded into the second housing portion 46 and sit flush with a base surface 46*a* of the second housing portion 46. In some embodiments, the magnets 58 may be press fit into openings in the second housing portion 46. In some embodiments, the magnets 58 may be embedded during a forming process of the second housing portion 46. In other embodiments, other methods of coupling the magnets to the second housing portion 46 may be used. In the illustrated embodiment, the plurality of magnets 58 includes three magnets positioned adjacent to the clamp mechanism 26 at the front end of the work light 10 and two magnets positioned adjacent to the handles 30, 34 at the rearward end of the work light 10. In other words, the second housing portion 46 includes more magnets adjacent the clamp mechanism 26 than adjacent the handles 30, 34. The three magnets 58 adjacent to the clamp mechanism 26 may be larger than the two magnets 58 adjacent to the handles 30, 34. In the illustrated embodiment, the three magnets 58 adjacent to the clamp mechanism 26 are N40 magnets, and the two magnets 58 adjacent to the handles 30, 34 are N45 magnets. In other embodiments, the second housing portion 46 may include fewer or more magnets adjacent the clamp mechanism 26 and/or adjacent the handles 30, 34. Additionally or alternatively, the second housing portion 46 may include other types of magnets. The base surface 46*a* is positioned on a side of the second housing portion 46 that faces away from the first housing portion 42. The base surface 46*a* may be placed on or adjacent to a work surface to magnetically attach the flood light 10 to the work surface or other support surface. The second housing portion 46 may include a textured surface 60 that covers at least a portion of the base surface 46*a*. In the illustrated embodiment, the textured surface 60 includes an overmold 60 formed of a material that improves the grip between the base surface 46*a* and the work surface. In other embodiments, the textured surface 60 may be formed in other ways.

Figure 4:
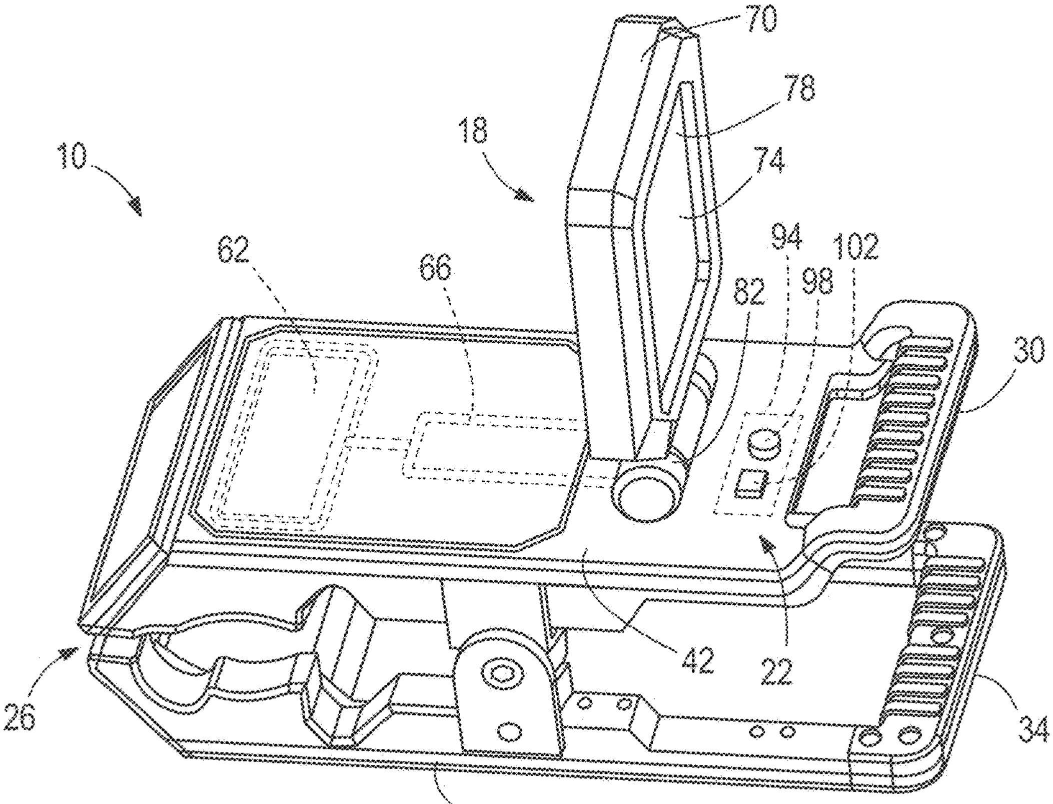
FIG. 4 is a side perspective view of the work light with the lighting unit in a first operation position.

With reference to FIG. 4, the flood light 10 further includes a main printed circuit board assembly (main PCBA) 62 disposed in and supported by the first housing portion 42. The main PCBA 62 is electrically connected to the battery receptacle 54 (FIG. 2) and the lighting unit 18 through, for example, wiring 66. As such, when the battery 38 is attached to, or inserted into, the battery receptacle 54, the battery 38 provides electricity through the wiring 66 to the main PCBA 62, and the main PCBA 62 provides electricity through the wiring 66 to the lighting unit 18.

Figure 5:
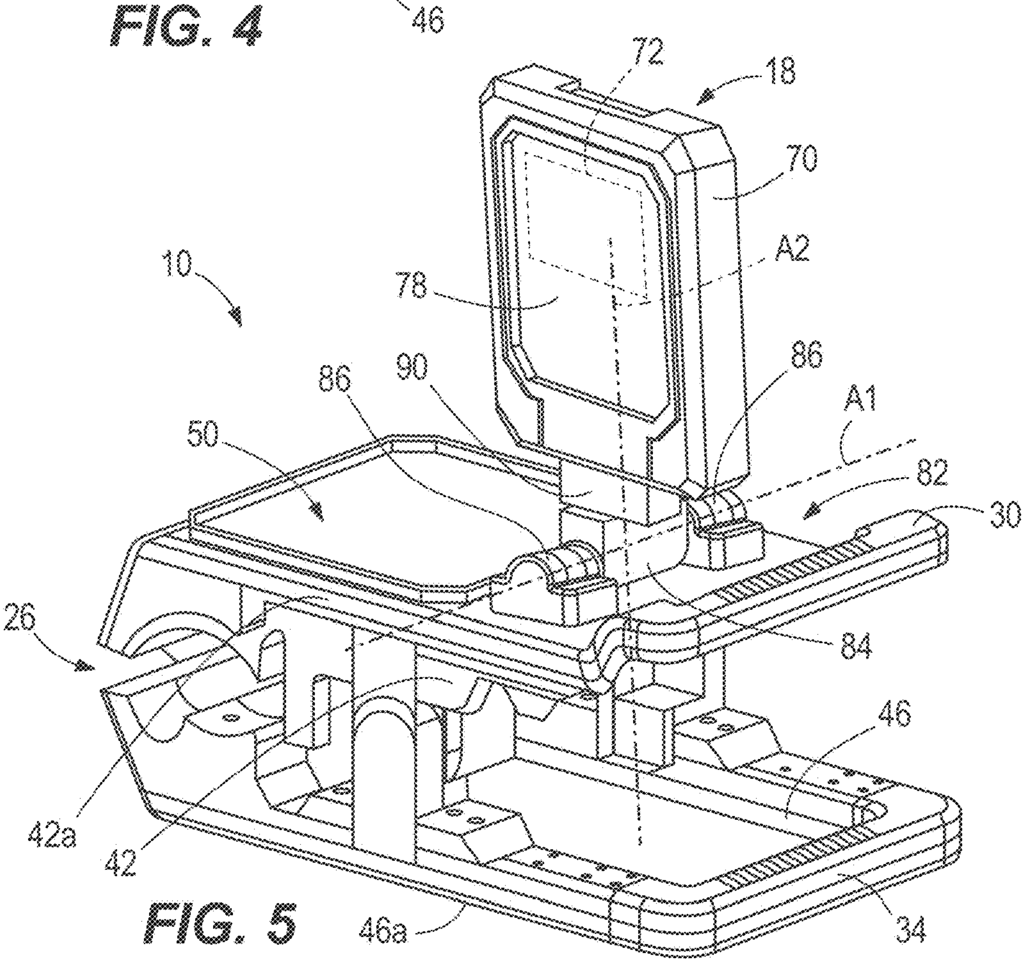
FIG. 5 is a rear perspective view of the work light with the lighting unit in a second operation position.

With reference to FIG. 5, the illustrated lighting unit 18 includes a lighting unit casing 70 and a light source 74 contained within the lighting unit casing 70. In the illustrated embodiment, the lighting unit 18 includes a lighting unit printed circuit board assembly 72 (a lighting unit PCBA) disposed in and supported by the lighting unit casing 70, and the light source 74 includes a plurality of light emitting diodes (LEDs) 74 arranged on and electrically connected to the lighting unit PCBA. A lens 78 is received by the lighting unit casing 70 in front of the LEDs 74 along a light emitting direction. When the battery 38 (FIG. 11) is attached to, or inserted into, the battery receptacle 54 (FIG. 2), the main PCBA 62 is configured to provide electricity to the lighting unit PCBA. As such the main PCBA 62 may supply electricity, or power, to the plurality of LEDs 74 through the lighting unit PCBA for illuminating the plurality of LEDs 74 to emit light through the lens 78.

As illustrated in FIG. 5, the lighting unit 18 is supported on the housing 14 by a lighting unit hinge 82. The lighting unit hinge 82 is attached to the first housing portion 42. The illustrated lighting unit hinge 82 allows the lighting unit 18 to move with two degrees of freedom. The lighting unit 18 is pivotable with respect to the housing 14 about a first axis A1 and is rotatable relative to the housing about a second axis A2, perpendicular to the first axis A1. In the illustrated embodiment, the lighting unit hinge 82 includes a base 84 that is hingedly coupled to the first housing portion 42 by a pair of hinges 86 mounted on the top surface 42*a*. The base 84, and by extension the lighting unit casing 70, are rotatable relative to the housing 14 about the first axis A1 defined by the hinges 86. The lighting unit casing 70 is coupled to the base 84 by a rotation joint 90. The lighting unit casing 70 is therefore rotatable relative to the base 84, and by extension the housing 14, about the second axis A2 defined by the rotation joint 90. The pair of hinges 86 and the rotation joint 90 are surrounded or covered (e.g., by the lighting unit casing 70) to inhibit any environmental ingress (e.g., moisture) from reaching the hinges 86 or the rotation joint 90, thereby reducing rusting and improving the lifespan of the lighting unit hinge 82.

As discussed above, the lighting unit 18 is movable to a storage position (FIG. 2) by pivoting the lighting unit 18 about the first axis A1 toward the top surface 42*a* and into the lighting unit receptacle 50. In the storage position, the lighting unit 18 may extend generally parallel to the top surface 42*a*. In the storage position, the lens 78 may either face toward or away from the first housing portion 42. When the lens 78 faces toward the first housing portion 42, the first housing portion 42 covers and protects the lens 78 from damage while the flood light 10 is not in use. When the lens 78 faces away from the first housing portion 42, the work light 10 may be turned on to emit light through the lens 78 while the lighting unit is the storage position. The lighting unit 18 is movable between a plurality of positions. From the storage position the lighting unit 18 may be pivoted about the first axis A1 to move the lighting unit casing 70 out of the lighting unit receptacle 50. The lighting unit 18 may be rotated about the second axis A2 to adjust the orientation of the lighting unit 18, and thus, the direction of light emission. In a first operation position (FIG. 4), the lighting unit 18 extends upright (e.g., generally perpendicular to the top surface 42*a* of the first housing portion 42) and is configured to emit light in a direction perpendicular to the first axis A1. In a second operation position (FIG. 5), the lighting unit 18 extends upright and is configured to emit light in a direction along the first axis A1, off of a side of the flood light 10 between the clamp mechanism 26 and the handles 30, 34. As such, the lighting unit 18 may be oriented in any position along the range of motion of the lighting unit 18 around the second axis A2. In some embodiments, the rotation joint 90 may include an integrated hard stop to inhibit over-rotation of the lighting unit 18 about the rotation joint 90 and reduce damage of electrical components, such as the wiring 66 (FIG. 4), extending through the rotation joint 90. In one example, the integrated hard stop may inhibit the lighting unit 18 from rotating more than 360 degrees around the second axis A2. The lighting unit 18 may be frictionally held in any of the storage position, the first operation position, the second operation position, or any position therebetween. For example, the pair of hinges 86 and the rotation joint 90 may each include O-rings or other components to apply a holding force to the lighting unit hinge 82. In other embodiments, the lighting unit 18 may be held in any of the positions using other methods or components.

With reference to FIG. 1, the user interface 22 includes at least one actuator allowing a user to control the output of the lighting unit 18. In the illustrated embodiment, the user interface 22 includes a power actuator 98 and a mode actuator 102. The actuators 98, 102 may be mounted on or electrically coupled to an actuator printed circuit board assembly (i.e., actuator PCBA) 94, as seen in FIG. 4. The actuator PCBA 94 is electrically connected to the main PCBA 62 by wires 66. In the illustrated embodiment, the power actuator 98 and the mode actuator 102 are buttons. In other embodiments, the power actuator 98 and the mode actuator 102 may be other types of actuators. The power actuator 98 is pressable to control the supply of electricity to the plurality of LEDs 74 for illuminating the plurality of LEDs 74. That is, the power actuator 98 is pressable to turn the plurality of LEDs 74 on and off. The mode actuator 102 is pressable to select a mode of illumination of the plurality of LEDs 74. In the illustrated embodiment, the mode actuator controls the intensity of illumination of the plurality of LEDs 74. For example, the mode actuator 102 may be pressable to switch the plurality of LEDs 74 between a high intensity mode, a medium intensity mode, and a low intensity mode. In some embodiments, the mode actuator may control a color of illumination of the plurality of LEDs 74 or may control a frequency of emission (e.g., strobe function) of the plurality of LEDs 74. In some embodiments, the user interface 22 may be capable of controlling multiple features of the illumination of the plurality of LEDs 74 using one or more mode actuators 102. In some embodiments, the user interface 22 may include additional components not described herein, such as a display, indicators, etc.

Figure 6:
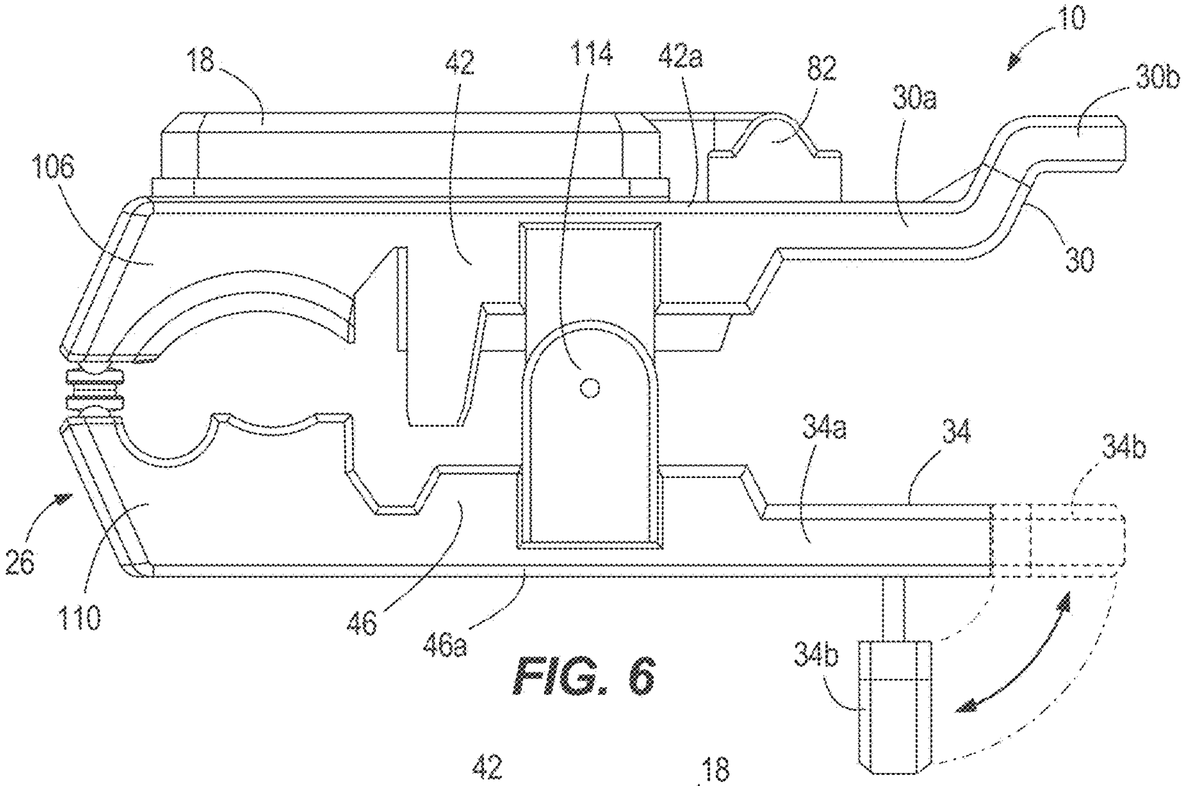
FIG. 6 is a side view of the work light of FIG. 1.
Figure 8:
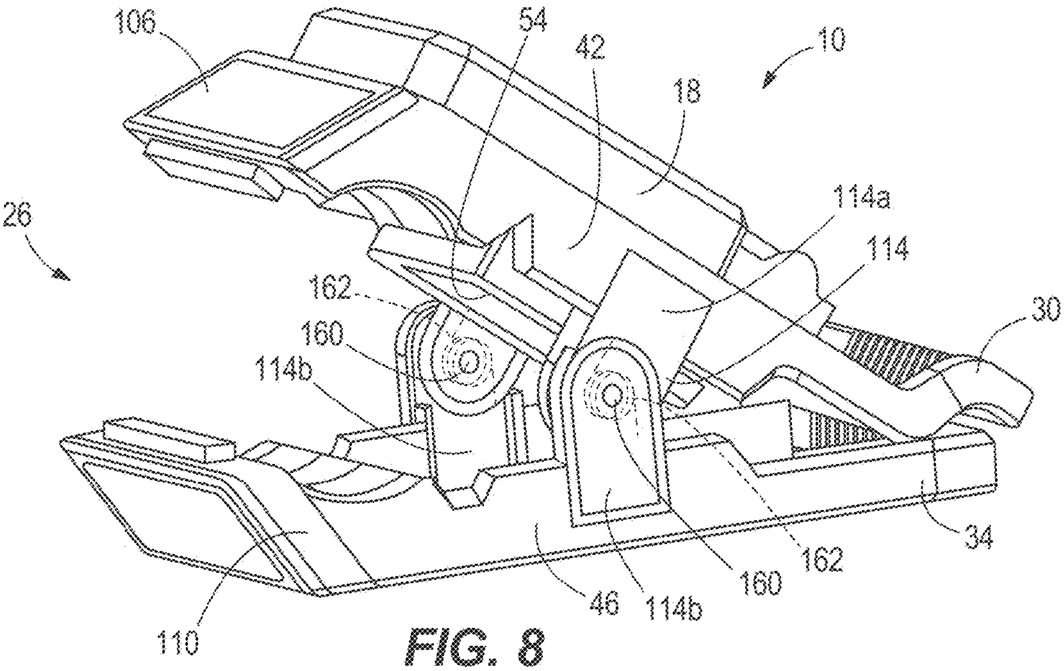
FIG. 8 is a front perspective view of the work light with the clamp mechanism in an open position.

Turning now to FIGS. 6 and 8, the clamp mechanism 26 includes a first jaw 106, a second jaw 110, and a housing hinge 114. The first jaw 106 is disposed on the first housing portion 42. The second jaw 110 is disposed on the second housing portion 46. In the illustrated embodiment, each of the first jaw 106 and the second jaw 110 is integrally formed with the respective one of the first housing portion 42 and the second housing portion 46. In other embodiments, each of the first jaw 106 and the second jaw 110 may be separately formed and fixed to the respective one of the first housing portion 42 and the second housing portion 46. The housing hinge 114 extends between the first housing portion 42 and the second housing portion 46 and enables the first housing portion 42 and the second housing portion 46 to pivot relative to each other. Specifically, the clamp mechanism 26 may be movable between a closed position (FIG. 6) and an open position (FIG. 8). In the closed position, the first jaw 106 and the second jaw 110 clamp together and the first housing portion 42 and the second housing portion 46 are generally parallel to each other. In the open position, the first jaw 106 is spaced from the second jaw 110 and the first housing portion 42 is inclined relative to the second housing portion 46. The housing hinge 114 may bias the clamp mechanism 26 to the closed position and the handles 30, 34 may be used to actuate the clamp mechanism 26 against the bias of the housing hinge 114 to move the clamp mechanism 26 to the open position.

Figure 7:
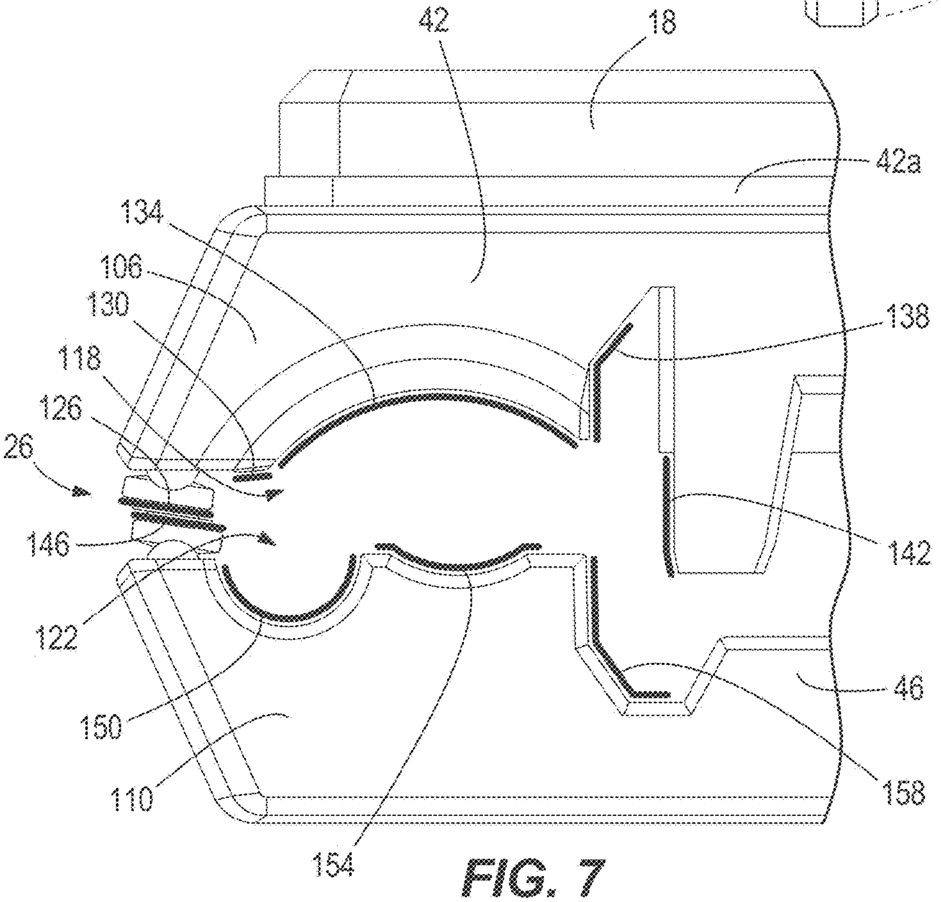
FIG. 7 is a zoomed-in side view of a portion of the work light with the clamp mechanism in a closed position.

With reference to FIG. 7, the first jaw 106 has a first jaw clamping profile 118, and the second jaw 110 has a second jaw clamping profile 122. The first jaw clamping profile 118 and the second jaw clamping profile 122 have complementary shapes to enable the clamp mechanism 26 to attach and secure the flood light 10 to a variety of support structures of different shapes and sizes (e.g., pipes, sheets of metal, wood boards/planks, metal studs) adjacent to the work area to position the flood light 10 to illuminate the work area. The first jaw clamping profile 118 and the second jaw clamping profile 122 may include a surface finish or overmold on all of or portions of the profiles 118, 122 that provides additional gripping strength to the contact surfaces of the profiles 118, 122.

The first jaw clamping profile 118 includes a first pivot clamp surface 126, a first small diameter portion 130, a first large diameter portion 134, a first stud portion 138, and a fulcrum portion 142. The first pivot clamp surface 126 is disposed at a forward end of the first jaw 106. The first pivot clamp surface 126 is able to pivot relative to the top surface 42*a* (e.g., via a ball joint) to adjust the angle relative to the top surface 42*a*. When the clamp mechanism 26 is in the closed position, the first pivot clamp surface 126 may extend at an angle relative to the top surface 42*a* of the first housing portion 42. The first small diameter portion 130 extends between the first pivot clamp surface 126 and the first large diameter portion 134. In some embodiments, the first small diameter portion 130 is substantially linear. In some embodiments, the first small diameter portion 130 may be arcuate. The first large diameter portion 134 extends from the first small diameter portion 130 to the first stud portion 138. The first large diameter portion 134 is arcuate. The first large diameter portion 134 may have a radius of approximately 1.5 inches. The first stud portion 138 extends from the first large diameter portion 134 toward the top surface 42*a* of the first housing portion 42. The fulcrum portion 142 is positioned between the first stud portion 138 and the battery receptacle 54 (FIG. 2). The fulcrum portion 142 is a protrusion that extends from the first housing portion 42 toward the second housing portion 46. When the clamp mechanism 26 is in the closed configuration the fulcrum portion 142 is spaced from the second housing portion 46. The fulcrum portion 142 is generally planar and extends perpendicular relative to the top surface 42*a*.

The second jaw clamping profile 122 includes a second pivot clamp surface 146, a second small diameter portion 150, a second large diameter portion 154, and a second stud portion 158. The second pivot clamp surface 146 is disposed at an end of the second jaw 110. The second pivot clamp surface 146 is able to pivot relative to the base surface 46*a* (e.g., via a ball joint) to adjust the angle relative to the base surface 46*a*. When the clamp mechanism 26 is in the closed position, the second pivot clamp surface 146 may extend at an angle relative to the base surface 46*a* of the second housing portion 46. In the illustrated embodiment, the first pivot clamp surface 126 and the second pivot clamp surface 146 contact and extend parallel to each other in the closed position. The second small diameter portion 150 extends between the second pivot clamp surface 146 and the second large diameter portion 154. The second small diameter portion 150 is arcuate. The second small diameter portion 150 may have a radius of approximately ½ inch. In the illustrated embodiment, the second small diameter portion 150 has a larger surface area than the first small diameter portion 130 of the first jaw clamping profile 118. The second large diameter portion 154 extends from the second small diameter portion 150 to the second stud portion 158. The second large diameter portion 154 is arcuate. The second large diameter portion 154 may have a radius similar to the radius of the first large diameter portion 134. In the illustrated embodiment, the second large diameter portion 154 has a smaller surface area than the first large diameter portion 134 of the first jaw clamping profile 118. The second stud portion 158 extends from the second large diameter portion 154 toward the base surface 46*a* of the second housing portion 46.

With reference to FIG. 8, in the illustrated embodiment, the clamp mechanism 26 includes two housing hinges 114 on either side of the battery receptacle 54. For the sake of brevity, only one of the housing hinges 114 is described below, but the description of the one of the housing hinges 114 applies equally to both housing hinges 114. The housing hinge 114 includes a first housing hinge portion 114*a*, a second housing hinge portion 114*b*, a shaft 160, and a torsion spring 162. The first housing hinge portion 114*a* is coupled to and extends from the first housing portion 42. The second housing hinge portion 114*b* is coupled to and extends from the second housing portion 46. In the illustrated embodiment, the first housing hinge portion 114*a* and the second housing hinge portion 114*b* are integrally formed in the respective one of the first housing portion 42 and the second housing portion 46. The first housing hinge portion 114*a* and the second housing hinge portion 114*b* are coupled to each other at a position between the first housing portion 42 and the second housing portion 46. The shaft 160 extends between the first housing hinge portion 114*a* and the second housing hinge portion 114*b* along an axis positioned between the first housing portion 42 and the second housing portion 46. The torsion spring 162 is coupled to the shaft 160 or is formed with the shaft 160 such that the torsion spring 162 may bias the first housing portion 42 relative to the second housing portion 46. With reference to FIGS. 7 and 8, in the illustrated embodiment, the torsion spring 162 biases the clamp mechanism 26 to the closed position (FIG. 6) and the clamp mechanism 26 may optionally include a locking mechanism to hold the clamp mechanism 26 in one or more open positions with the first jaw 106 spaced from the second jaw 110. In other embodiments, the torsion spring 162 may bias the clamp mechanism 26 to the open position (FIG. 8), and the flood light 10 may include a locking mechanism for holding the clamp mechanism 26 in the closed position (FIG. 7).

In one use of the flood light 10, the clamp mechanism 26 may couple to a thin body, such as a metal sheet or thin panel, by engaging the first pivot clamp surface 126 and the second pivot clamp surface 146 on either side of the thin body. The torsion spring 162 may bias the jaws 106, 110 toward each other, almost to the closed position, so the first pivot clamp surface 126 and second pivot clamp surface 146 are held in contact with the thin body, supporting the flood light 10 to provide illumination to an adjacent work area. The fulcrum portion 142 of the first jaw clamping profile 118 provides a stop surface for the thin body to rest on when the thin body is clamped between the first pivot clamp surface 126 and the second pivot clamp surface 146. As such, the fulcrum portion 142 inhibits the thin body from extending between the first jaw 106 and the second jaw 110 far enough to reach the battery receptacle 54, thereby protecting the battery 38 (FIG. 11) from damage or accidental disengagement caused by the thin body.

In another use of the clamp mechanism 26, the first small diameter portion 130 and the second small diameter portion 150 may be used to clamp onto a pipe with a relatively small diameter. The clamp mechanism 26 may be configured so that multiple sizes of small diameter pipe may be engaged by the first small diameter portion 130 and the second small diameter portion 150. The second small diameter portion 150 may have a radius that corresponds to one of the diameters of pipe capable of being clamped between the first small diameter portion 130 and the second small diameter portion 150. For example, the first small diameter portion 130 and the second small diameter portion 150 may be used to clamp onto a pipe having an outside diameter up to 1 inch. In one embodiment, in the closed position, the first small diameter portion 130 and the second small diameter portion 150 are spaced apart by an amount smaller than the diameter of the pipe such that when the torsion spring 162 biases the jaws 106, 110 toward each other, the first small diameter portion 130 engages one side of the pipe and the second small diameter portion 150 engages the other side of the pipe, and the clamp mechanism 26 does not fully move to the closed position. The pressure of the first small diameter portion 130 and the second small diameter portion 150 may hold the flood light 10 in a specific orientation relative to the pipe. In some embodiments, the first small diameter portion 130 and second small diameter portion 150 are spaced apart by an amount equal to or larger than the diameter of the pipe, and the clamp mechanism 26 moves to the closed position. The flood light 10 may hang from the pipe such that the orientation of the flood light 10 relative to the pipe is determined by gravity. In all embodiments, once the flood light 10 is coupled to the small diameter pipe, the lighting unit 18 may be adjusted to direct the emission of light toward the work area.

In another use of the clamp mechanism 26, the first large diameter portion 134 and the second large diameter portion 154 may be used to clamp onto a pipe with a relatively large diameter for attaching the flood light 10 to the pipe with a relatively large diameter. For example, the first large diameter portion 134 and the second large diameter portion 154 may be used to clamp onto a pipe having an outside diameter up to 3 inches. In the closed position, the first large diameter portion 134 and the second large diameter portion 154 are spaced apart by a distance less than the diameter of the pipe such that the engagement of the first large diameter portion 134 with one side of the pipe and the second large diameter portion 154 with the second side of the pipe clamps the pipe to support the flood light 10. The force of the clamp mechanism 26 may maintain an orientation of the flood light 10 relative to the pipe. Once the flood light 10 is coupled to the pipe, the lighting unit 18 may be adjusted to direct the emission of light toward the work area.

In yet another use of the clamp mechanism 26, the first stud portion 138 and the second stud portion 158 may be used to clamp onto a wall stud, such as a metal or wooden stud, or other beam shaped support structure. The clamp mechanism 26 supports the flood light 10 on the wall stud with the first stud portion 138 engaging one side of the stud and the second stud portion 158 engaging the second side of the stud. The stud may also engage the fulcrum portion 142 to prevent the stud from interfering with the battery interface 54.

With reference to FIG. 6, the first handle 30 extends from the first housing portion 42, and the second handle 34 extends from the second housing portion 46. In the illustrated embodiment, the first handle 30 is integrally formed with the first housing portion 42, and the second handle 34 is separately formed and attached to the second housing portion 46. In other embodiments, both of the first handle 30 and the second handle 34 may be separately formed from and fixedly attached to the respective one of the first housing portion 42 and the second housing portion 46. The first handle 30 and the second handle 34 are operable to open and close the clamp mechanism 26. In the closed position, at least a portion of the first handle 30 extends parallel to the second handle 34. To open the clamp mechanism 26, the first handle 30 may be moved toward the second handle 34 to rotate the first housing portion 42 about the housing hinge 114 against the bias of the torsion spring 162.

The first handle 30 includes an extension portion 30*a* that extends from the first housing portion 42 parallel to the top surface 42*a* of the first housing portion 42, and a grip portion 30*b* that extends outwardly from the extension portion 30*a* in a direction extending away from the second housing portion 46 (e.g., when the clamp mechanism 26 is in the closed position). In some embodiments, the grip portion 30*b* is parallel to, but offset from the extension portion 30*a*. The grip portion 30*b* enables a wider pivoting range for the first housing portion 42 relative to the second housing portion 46. That is, without the outward extension of the grip portion 30*b*, a typical handle would hit, or engage, the second handle 34 and inhibit rotation of the handle relative to the second handle 34 sooner than a handle including the outwardly extending grip portion 30*b*. As such, the grip portion 30*b* enables the first handle 30 to have a wider range of motion relative to the second handle 34. In one embodiment, the clamp mechanism 26 is openable to a fully open position in which the distance between the first pivot clamp surface 126 and the second pivot clamp surface 146 is over 3 inches. The offset grip portion 30*b* also provides additional clearance to connect the battery 38 (FIG. 11) to the battery receptacle 54 (FIG. 2).

As illustrated best in FIG. 6, the second handle 34 includes an extension portion 34*a* and a grip portion 34*b* coupled to the extension portion 34*a*. The extension portion 34*a* extends from the second housing portion 46 and extends parallel to the base surface 46*a* of the second housing portion 46. In the illustrated embodiment, the grip portion 34*b* is movable relative to the extension portion to allow better access to the battery receptacle 54. The grip portion 34*b* is movable between an aligned position, in which the grip portion 34*b* is in line with the extension portion 34*a*, and an extended position, in which the grip portion 34*b* is spaced further away from the first housing portion 42. In the illustrated embodiment, in the extended position the grip portion 34*b* is rotatable away from the first housing portion 42. In the illustrated embodiment, the grip portion 34*b* may pivot about 90 degrees relative to the extension portion 34*a*. In other embodiments, the grip portion 34*b* may pivot a greater or lesser amount relative to the extension portion 34*a*. In other embodiments, the grip portion 34*b* may be otherwise moved away from the first housing portion 42 to widen the space between the first housing portion 42 and the second housing portion 46 and therefore allow better access to the battery receptacle 54.

Figure 9:
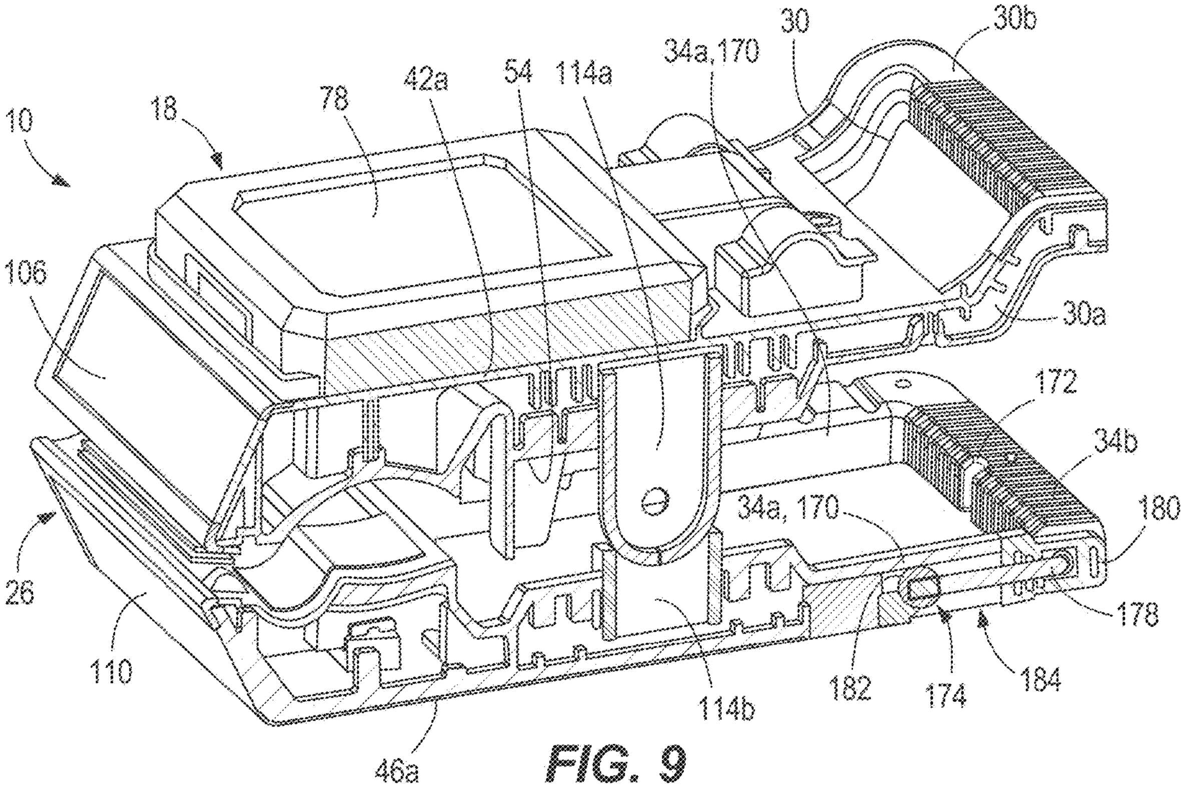
FIG. 9 is a cross-sectional view of the work light taken along line 9-9 in FIG. 2.

With reference to FIG. 9, the extension portion 34*a* includes a pair of extension arms 170, and the grip portion 34*b* extends between the extension arms 170. In the illustrated embodiment, the grip portion 34*b* includes a notch 172 in the middle of the grip portion 34*b* that is configured to receive a nail, hook, or screw, for example, to hang the flood light 10 from a structure adjacent to the work area. The second handle 34 includes a pair of joints 174 allowing the grip portion 34*b* to move with respect to the extension portion 34*a* between the aligned position and the extended position. In the illustrated embodiment, the joints 174 are pivot joints. In other embodiments, other types of joints may be used depending on the desired movement of the grip portion 34*b*. The second handle 34 further includes at least one detent mechanism 176 (FIG. 10) configured to retain the grip portion 34*b* in the aligned position.

With continued reference to FIG. 9, the grip portion 34*b* includes a reinforcement bar 178 disposed within an outer casing 180. In some embodiments, the reinforcement bar 178 may be formed from metal or another material with high strength. The outer casing 180 may be formed from plastic. In the illustrated embodiment, each joint 174 includes a reinforcement bar 178. In some embodiments, the reinforcement bar 178 may extend through the entire grip portion 34*b* and be a single U-shaped bar. The reinforcement bar 178 extends out from the grip portion 34*b* to a pivot end 182, supported in the extension portion 34*a*. The pivot end 182 is supported in the extension portion 34*a* for rotation about a pivot axis. The grip portion 34*b* may be rotated about the pivot axis defined by the pivot end 182 and moved to the extension position (FIG. 11).

Figure 10:
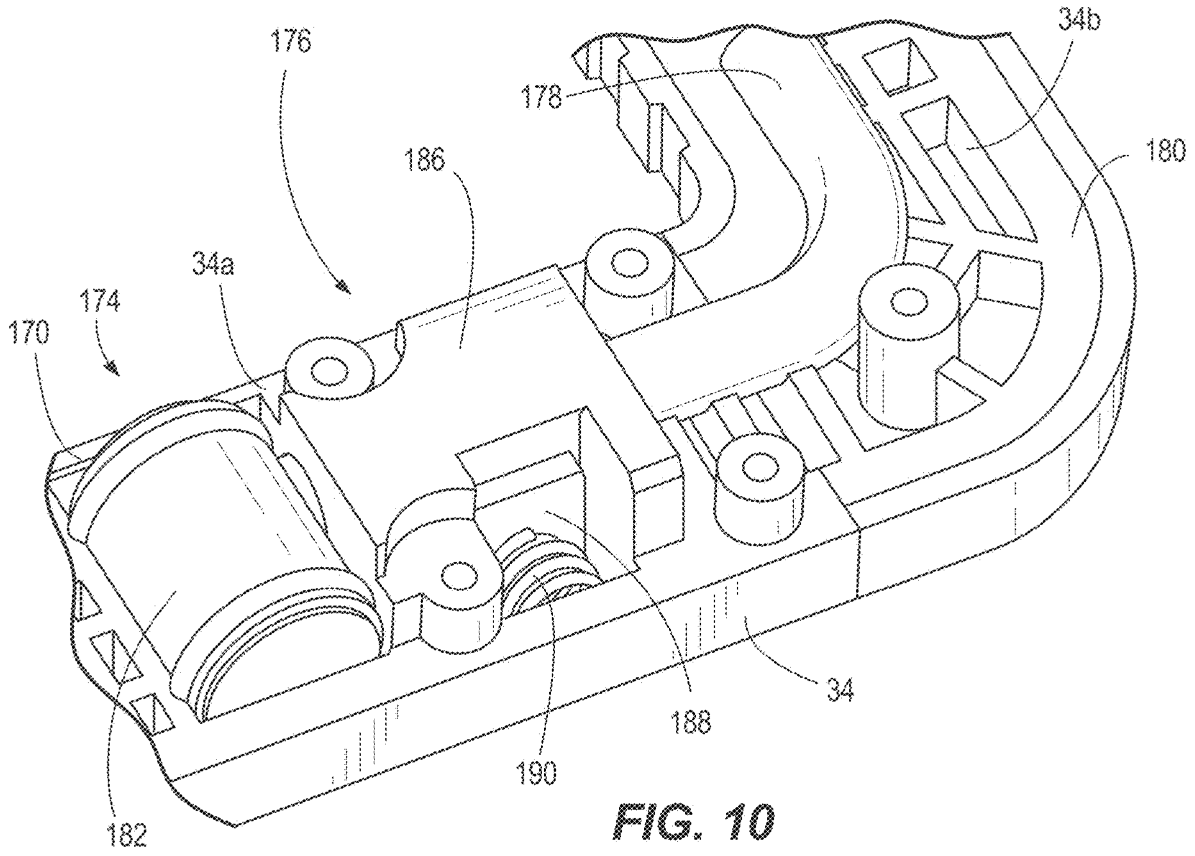
FIG. 10 is a perspective view of a portion of the work light.
Figure 11:
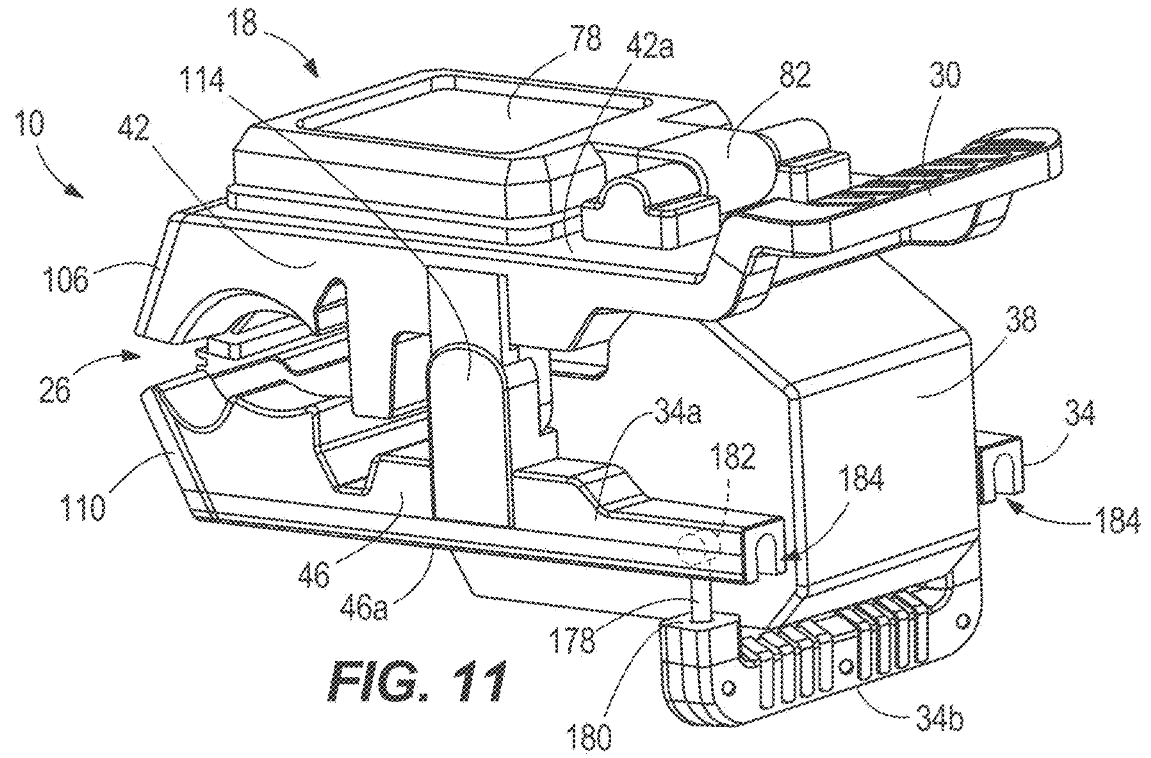
FIG. 11 is a perspective view of the work light including a battery coupled to the housing.

As seen best in FIG. 11, the pivot end 182 of the reinforcement bar 178 is spaced from the end of the extension arm 170. When the reinforcement bar 178 pivots about the pivot end 182, the reinforcement bar 178 moves through a channel 184 formed in the end of the extension arm 170. The detent mechanism 176 (FIG. 10) is positioned in the channel 184 to engage the reinforcement bar 178 in the aligned position. In some embodiments, only one side has a detent mechanism 176. In some embodiments, both sides include identical detent mechanisms 176. In some embodiments, both sides include different types of detent mechanisms 176.

Turning now to FIG. 10, the detent mechanism 176 includes a block 186 defining at least a portion of the channel 184, a plate 188 slidably mounted in the extension arm 170 adjacent the channel 184, and a spring 190 engaging the plate 188. When the grip portion 34*b* is in the aligned position, as shown in FIG. 10, the detent mechanism 176 engages the reinforcement bar 178 to retain the grip portion 34*b* in the aligned position. The reinforcement bar 178 is positioned in the channel 184, and the spring 190 biases the plate 188 into engagement with the reinforcement bar 178. The plate 188 may be curved or otherwise shaped to clamp the reinforcement bar 178. In the illustrated embodiment, the spring 190 includes a compression spring; however, any known biasing techniques may be used to move the plate into engagement with the reinforcement bar 178. The spring 190 provides a biasing force to the plate 188 which provides a retaining force on the reinforcement bar 178 within the second handle 34. To move the grip portion 34*b* to the extended position and disengage the detent mechanism 176, a downward force may be applied to the grip portion 34*b* of the second handle 34 that is greater than the retaining force provided by the spring 190. In some embodiments, the force used to overcome the retaining force may be about 6 lbs. Upon application of a force to the grip portion 34*b* of the second handle 34 that is greater than the residual retaining force, the reinforcement bar 178 pivots out of the channel 184 and the grip portion 34*b* pivots relative to the extension portion 34*a* in a direction away from the first housing portion 42 to the extended position (FIG. 11). When the grip portion 34*b* is returned to the aligned position, the user may apply a force to cause the reinforcement bar 178 to move into the channel 184 so the detent mechanism 176 may engage the reinforcement bar 178 and retain the grip portion 34*b* in the aligned position again. In some embodiments, the second handle 34 may alternately or additionally include actuators or buttons that need to be depressed in order to move the grip portion 34*b* from the alignment position.

The described joints 174 and detent mechanism 176 are designed to not interfere with the use of the second handle 34 in operating the clamp mechanism 26. Force may be applied to the second handle 34 to move it toward the first handle 30 without risk of accidentally disengaging the detent mechanism 176 or moving the grip portion 34*b* relative to the extension portion 34*a*. Similarly, force may be applied to move the grip portion 34*b* to the extended position without disengaging the clamp mechanism 26. In other embodiments, other types of detent or selective locking mechanisms may be used. In other embodiments, instead of or in addition to the detent mechanism 176 the second handle 34 may include a biasing mechanism configured to bias and return the grip portion 34*b* to the aligned position.

As illustrated in FIG. 11, when the grip portion 34*b* is in the rotated position, the grip portion 34*b* provides more clearance for the battery 38 to be inserted and removed from the battery receptacle 54 than when the grip portion 34*b* of the second handle 34 is in a non-rotated position (e.g., as illustrated in FIG. 9). Therefore, the pivotable grip portion 34*b* enables the flood light 10 to be compatible with and couple to batteries of different sizes. Once the battery 38 is coupled to the battery receptacle 54, the grip portion 34*b* of the second handle 34 may be returned to the aligned position to allow the user to operate the clamp mechanism 26. The grip portion 34*b* may also secure the battery 38 or inhibit the battery 38 from inadvertently sliding, or de-coupling, from the battery receptacle 54.

Figure 12:
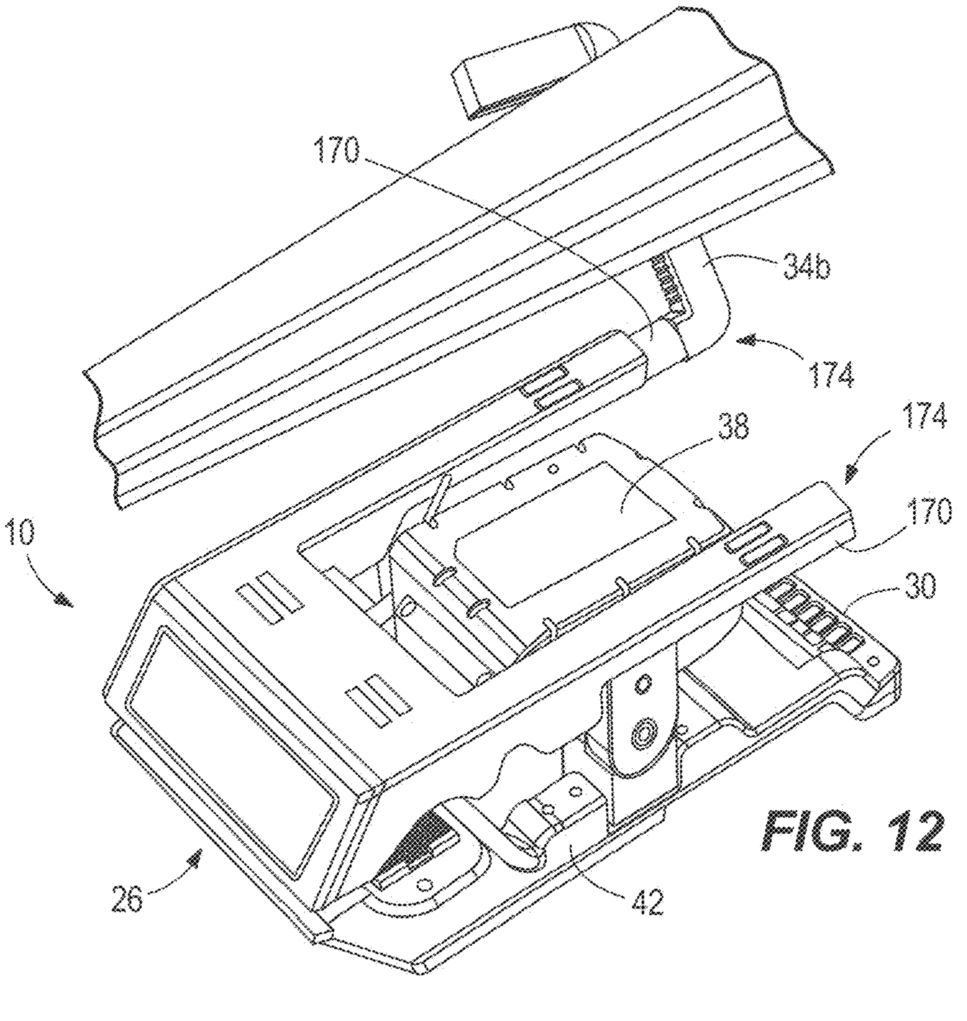
FIG. 12 is a perspective view of a work light according to another embodiment of the disclosure.

In some embodiments of the disclosure, such as the embodiment illustrated in FIG. 12, the second handle 34 may be operable as a hook to hang the flood light 10 from a structure adjacent to the work area. Specifically, one of the sides of the grip portion 34*b* may be removably coupled to the extension arm 170. The grip portion 34*b* may be pivoted about an axis defined by one of extension arms 170 of the second handle 34 to different orientations for hanging the flood light 10 from an over-head beam or another similar structure. In some embodiments, the grip portion 34*b* may be recoupled to the extension arm 170 surrounding the beam. In other embodiments, the grip portion 34*b* is hook shaped and hangs from the beam.

With reference to FIG. 1, to use the flood light 10 to illuminate the work area 5, the flood light 10 may be secured directly on a work surface or in a desired location adjacent to the work area 5 using at least one of the magnetic base surface 46*a* (FIG. 3), the clamp mechanism 26, or the handles 30, 34. In one use, with reference to FIG. 3, the base surface 46*a* may be placed on a work surface (or an adjacent surface) such that the magnets 58 in the second housing portion 46 create a magnetic connection between the flood light 10 and the work surface (or the adjacent surface). In another use, with reference to FIGS. 7 and 8, the clamp mechanism 26 may be used to clamp the flood light 10 to a structure adjacent to the work area 5. Specifically, the clamp mechanism 26 may be moved to the open position (FIG. 8) by moving the first handle 30 toward the second handle 34 to pivot the first housing portion 42 relative to the second housing portion 46 against the bias of the torsion spring 162 of the housing hinge 114. The first jaw clamping profile 118 and the second jaw clamping profile 122 may then be aligned together around a desired support structure adjacent to the work area 5, and the clamp mechanism 26 may move toward the closed position by the torsion spring 162, which moves the first handle 30 away from the second handle 34 such that the first jaw clamping profile 118 and the second jaw clamping profile 122 come together around the desired structure to clamp the flood light 10 to the desired structure. In a further use, with reference to FIGS. 1 and 2, the flood light 10 may be placed on the work surface (or an adjacent surface) by effectively standing the flood light 10 by the handles 30, 34. That is, the grip portions 30*b*, 34*b* of the first handle 30 and the second handle 34 may be placed in contact with the work surface (or an adjacent surface) such that the flood light 10 is supported on the surface by the handles 30, 34. In yet another use, with reference to FIGS. 9 and 11, the flood light 10 may be hung by the notch 172 in the grip portion 34*b* of the second handle 34 from a nail, a hook, or another similar structure, while the grip portion 34*b* is in either the rotated or non-rotated position.

With reference to FIGS. 1 and 5, once the flood light 10 is positioned and secured in a desired position and orientation relative to the work area 5, the lighting unit 18 may be adjusted to one of the plurality of operation positions. Specifically, the lighting unit 18 may be moved from the storage position toward the first operation position by pivoting the lighting unit 18 about the first axis A1 defined by the hinges 86 of the lighting unit hinge 82. The lighting unit 18 may also be rotated around the second axis A2 defined by the rotation joint 90 so that the lens 78 of the lighting unit 18 faces the work area 5 at a desired angle. To illuminate the work area, the power actuator 98 may be pressed to supply electricity to the plurality of LEDs 74 (FIG. 4) in the lighting unit 18 to emit light through the lens 78 and onto the work area 5 and the mode actuator 102 may be pressed to toggle the lighting unit 18 to the desired type of illumination.

Figure 13:
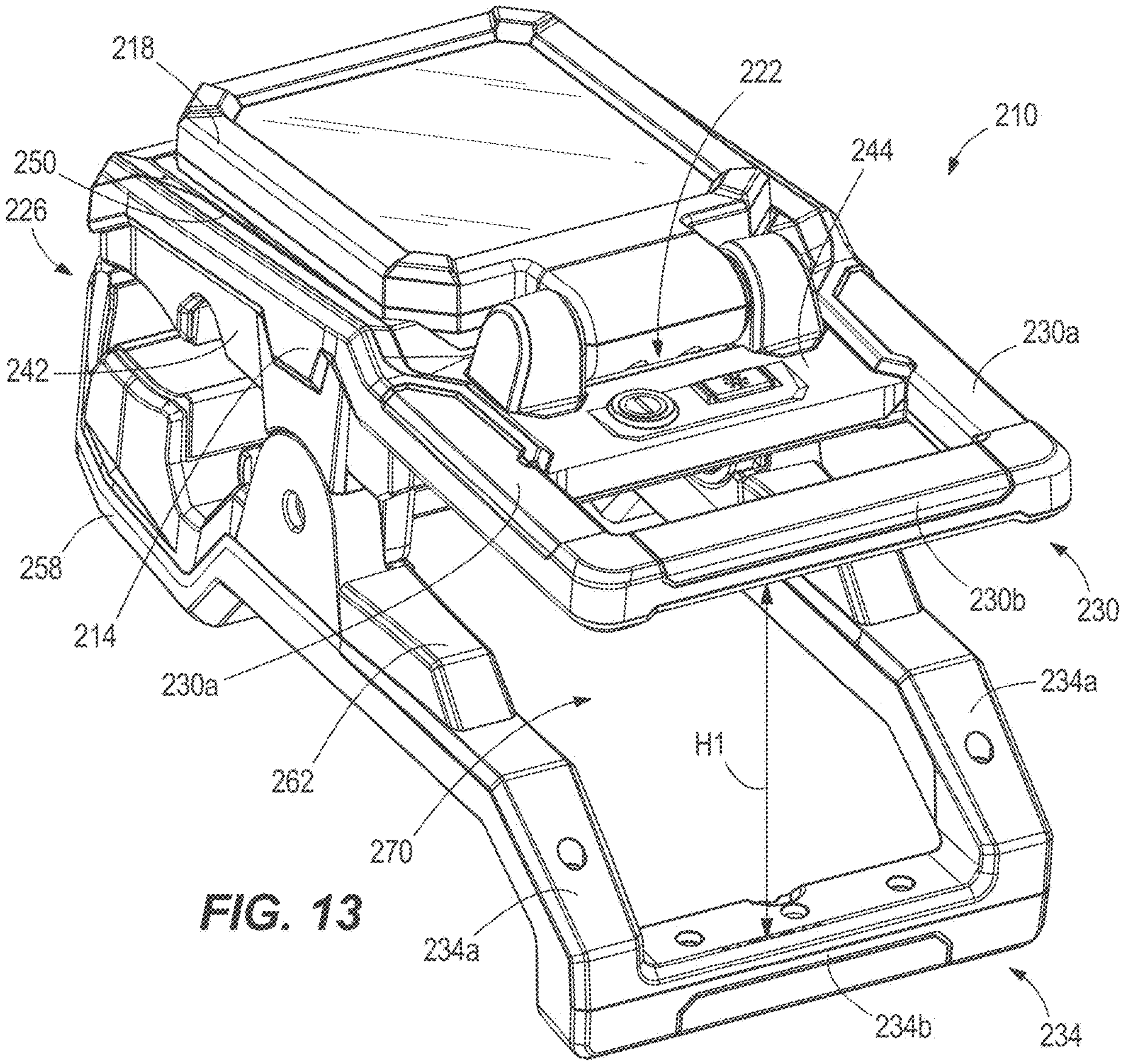
FIG. 13 is a perspective view of a work light according to another embodiment of the disclosure.
Figure 14A:
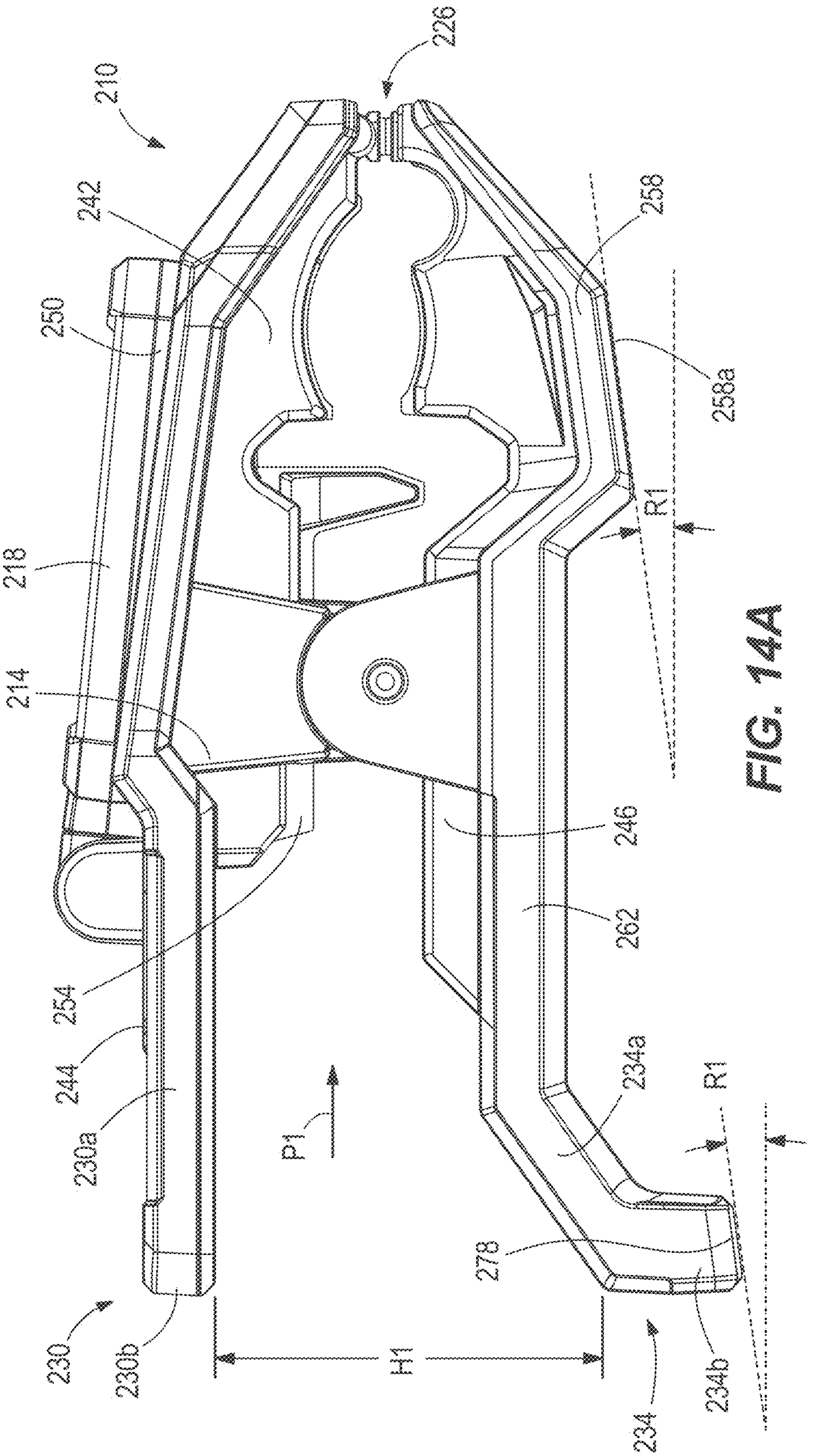
FIG. 14A is a side view of the work light of FIG. 13.
Figure 14B:
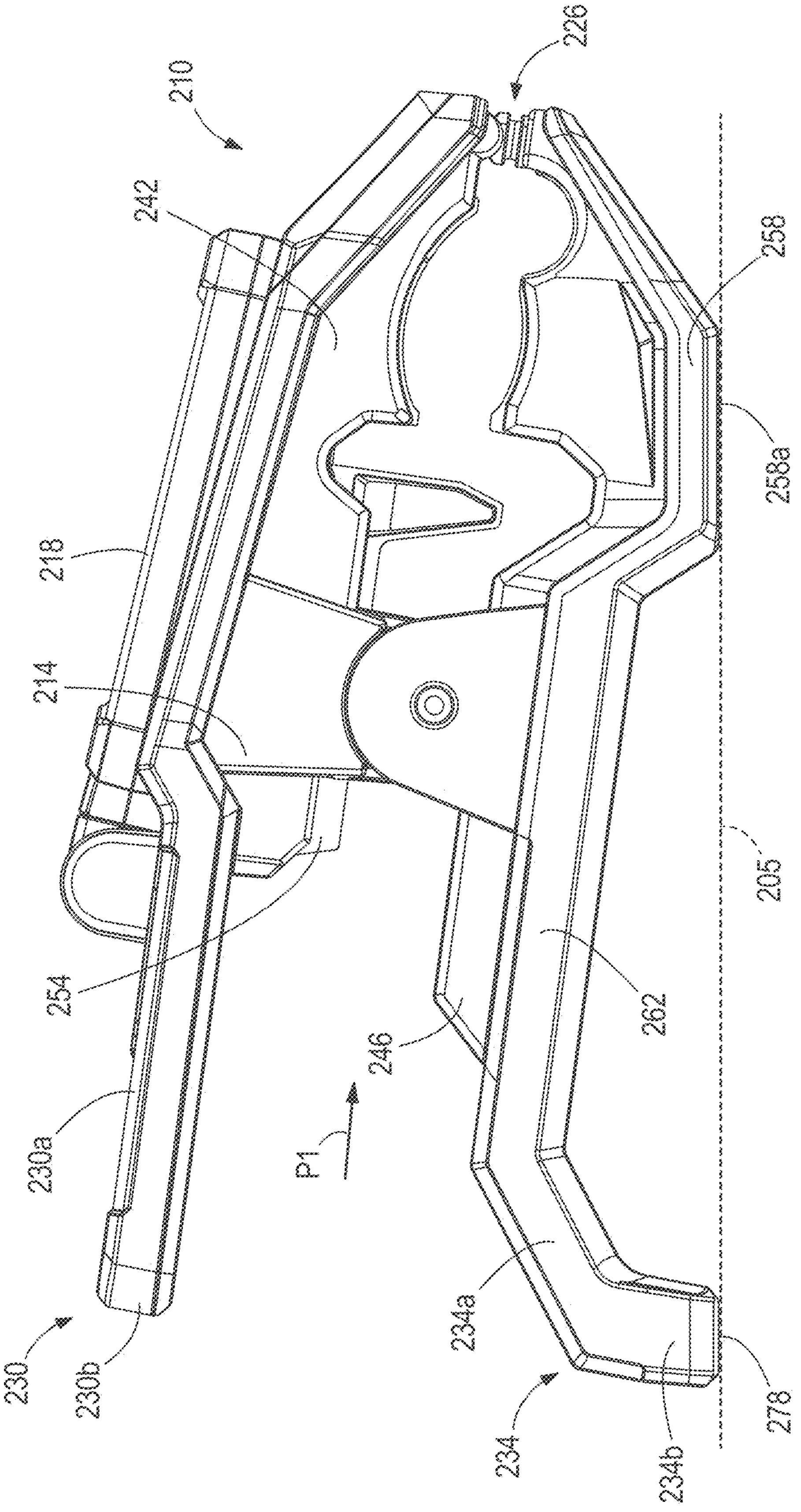
FIG. 14B is a side view of the work light of FIG. 13 in which the orientation of the work light as been rotated by an angle.
Figure 15:
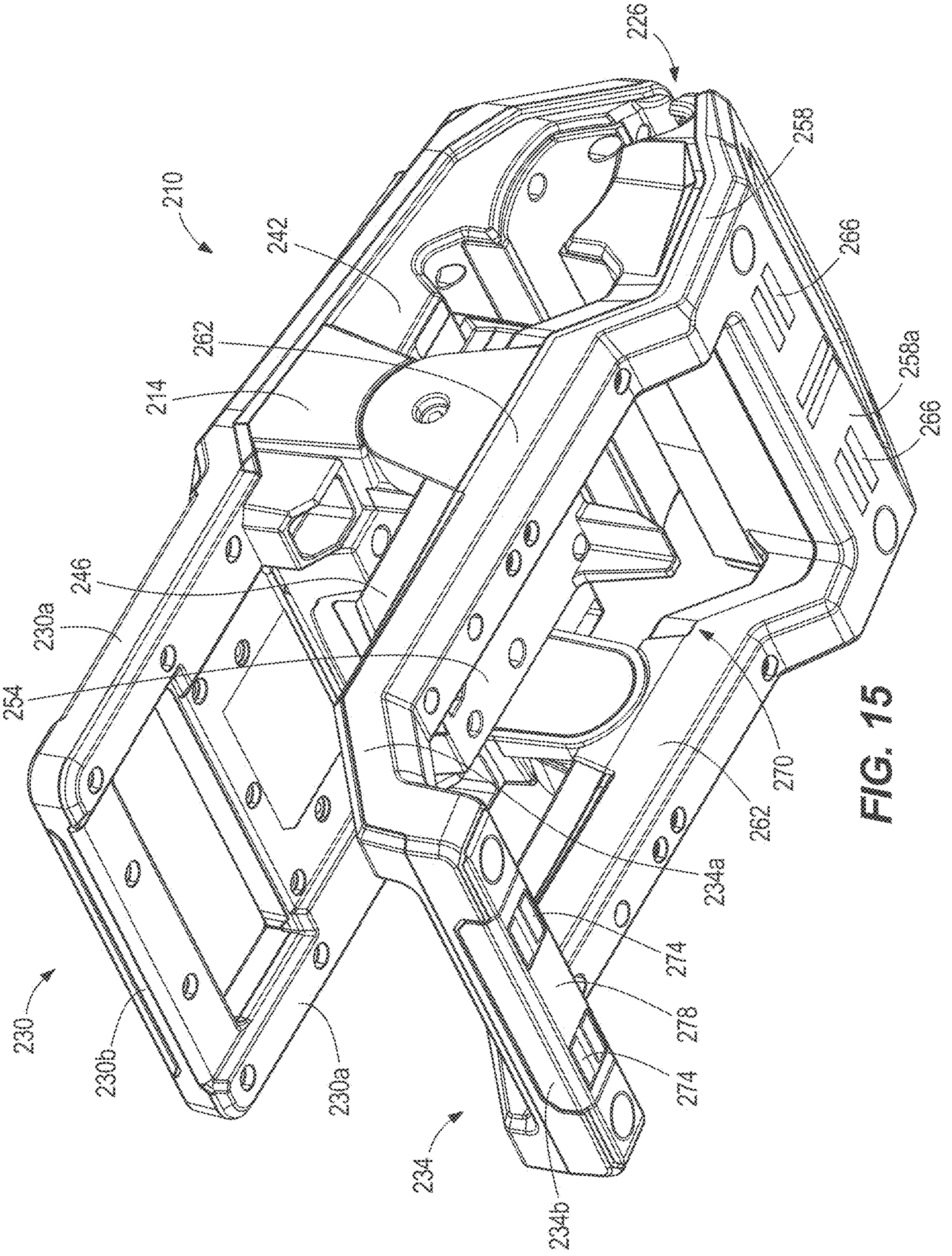
FIG. 15 is another perspective view of the work light of FIG. 13.

FIGS. 13-15 illustrate a work light 210 according to another embodiment of the disclosure. The work light 210 may also be referred to as a flood light 210. The flood light 210 may be substantially similar to the flood light 10 of FIGS. 1-12, except for the differences described herein. As such, the flood light 210 is configured to provide illumination for a work area at different angles and from different heights relative to the work area.

As illustrated in FIGS. 13-15, the flood light 210 includes a housing 214, a lighting unit 218, a user interface 222, a clamp mechanism 226, a first handle 230, and a second handle 234. Although not illustrated in FIGS. 13-15, a battery, such as the battery 38 of FIG. 11, may be removably attached to a battery interface 54 of the housing 214 for providing power to the lighting unit 218. The lighting unit 218 is movably (e.g., pivotably and/or rotationally) mounted to the housing 214 and is configured to illuminate the work area. Specifically, the lighting unit 218 has two degrees of freedom and may be movable relative to the housing 214 in a substantially similar manner as the lighting unit 18 of FIG. 1. The clamp mechanism 226 is positioned at a first or front end of the work light 210. The clamp mechanism 226 is integrally formed with the housing 214 and is operable for attaching and securing the flood light 210 on or adjacent to a work surface. The clamp mechanism 226 is formed and may be used substantially similarly as the clamp mechanism 26 of FIG. 1. Each of the first handle 230 and the second handle 234 is formed on the housing 214 and is graspable to actuate and operate the clamp mechanism 226. The handles 230, 234 are positioned at a second or rearward end of the work light 210.

As illustrated in FIGS. 14A and 14B, the housing 214 includes a first housing portion 242 and a second housing portion 246. In the illustrated embodiment, the first housing portion 242 and the second housing portion 246 are separately formed and pivotably coupled to each other. As such, the first housing portion 242 and the second housing portion 246 may pivot relative to one another about a pivot axis. The first housing portion 242 includes the battery receptacle 254 for receiving a battery and electrically connecting the battery to the lighting unit 218. The battery is insertable into the battery receptacle 254 along an insertion direction P1 and may be supported between the first housing portion 242 and the second housing portion 246. The battery receptacle 254 may include, for example, guide rails and electrical contacts for physically and electrically coupling to the battery. In the illustrated embodiment, the insertion direction P1 extends parallel to the guide rails. The insertion direction P1 also extends perpendicular to the pivot axis between the housing portions 242, 246. In other embodiments, the insertion direction P1 may extend in a different direction relative to the battery receptacle 254.

As illustrated in FIGS. 13 and 14A, the first housing portion 242 further includes a user interface panel 244 and a lighting unit receptacle 250. The user interface panel 244 supports the user interface 222. The user interface panel 244 is oriented parallel to the insertion direction P1 for the battery. The lighting unit receptacle 250 is configured to receive the lighting unit 218 when the lighting unit 218 is in a storage position (e.g., as illustrated in FIG. 13). In the illustrated embodiment, the lighting unit receptacle 250 is inclined with respect to the user interface panel 244. As such, the lighting unit receptacle 250 extends at an angle relative to the insertion direction P1 for the battery. In other embodiments, the lighting unit 218 may extend parallel to the user interface panel 244.

With reference to FIGS. 14A-15, the second housing portion 246 includes a base 258, a pair of extensions 262 or arms 262, and a first plurality of magnets 266. The base 258 is positioned at the front end of the work light 210. The base 258 includes a base surface 258*a* that extends at an angle RI relative to the insertion direction P1. The base surface 258*a* is configured to be placed on a work surface 205 (FIG. 14B) to support the flood light 210 on the work surface 205. The extensions 262 are inclined with respect to the base surface 258*a* and extend upward from the base 258 (e.g., toward the first housing portion 242) such that the extensions 262 do not touch the work surface 205 when the base surface 258*a* is placed on the work surface 205. The extensions 262 are substantially parallel to the insertion direction P1 for the battery. The extensions 262 define an aperture 270 therebetween that is sized to accommodate a battery when the battery is coupled to the battery receptacle 254. The first plurality of magnets 266 are housed within the base 258 of the second housing portion 246 and may be embedded adjacent the base surface 258*a*. As such, the plurality of magnets 266 may create a magnetic connection between the base 258 and the work surface 205 to magnetically attached the flood light 210 to the work surface 205.

With reference to FIGS. 14B and 15, the second handle 234 additionally includes a second plurality of magnets 274. The second plurality of magnets 274 may be embedded adjacent a bottom grip surface 278 of a grip portion 234*b* of the second handle 234. The bottom grip surface 278 extends at an angle RI relative to the insertion direction P1. In the illustrated embodiment, the bottom grip surface 278 and the base surface 258*a* of the base 258 of the second housing portion 246 extend at the same angle RI relative to the insertion direction P1. As such, the bottom grip surface 278 and the base surface 258*a* are coplanar and may be placed on the work surface 205 to simultaneously support the flood light 210 on the work surface 205. Further, the second plurality of magnets 274 may strengthen the magnetic connection between the flood light 210 and the work surface 205.

Returning to FIGS. 14A and 14B, the first handle 230 extends from the first housing portion 242, and the second handle 234 extends from the second housing portion 246. In the illustrated embodiment, the first handle 230 may be integrally formed with the first housing portion 242, and the second handle 234 may be integrally formed with the second housing portion 246. In other embodiments, either or both of the first handle 230 and the second handle 234 may be separately formed and attached to a respective one of the first housing portion 242 and the second housing portion 246. The first handle 230 and the second handle 234 are operable to open and close the clamp mechanism 226.

The first handle 230 includes first handle arms 230*a* and a first grip portion 230*b* extending between the first handle arms 230*a*. Each of the first handle arms 230*a* extends along a corresponding side of the user interface panel 244 (FIG. 13). As such, the first handle arms 230*a* extend parallel to the insertion direction P1 for the battery. The first grip portion 230*b* extends between the first handle arms 230*a* and is graspable to rotate, or pivot, the first housing portion 242 relative to the second housing portion 246 for operating the clamp mechanism 226.

The second handle 234 includes second handle arms 234*a* and a second grip portion 234*b* extending between the second handle arms 234*a*. The second handle arms 234*a* extend from the extensions 262 of the second housing portion 246 at an angle relative to the extensions 262. Specifically, the second handle arms 234*a* of the second handle 234 extend at an angle relative to the extensions 262 such that the second handle arms 234*a* extend at least partially away from the first housing portion 242. The second grip portion 234*b* is positioned below the second handle arms 234*a* (e.g., on a side of the arms 234*a* that is opposite from the first housing portion 242) and extends between the second handle arms 234*a*. As such, the second grip portion 234*b* is graspable to rotate, or pivot, the second housing portion 246 relative to the first housing portion 242 for operating the clamp mechanism 226.

The handles 230, 234 are formed to provide adequate space for insertion and removal of a battery into/from the battery receptacle 254. Specifically, when the clamping mechanism 226 is in the closed position, the handles 230, 234 define an insertion height H1 between the first grip portion 230*b* and the second grip portion 234*b*. The insertion height H1 is the maximum height a battery can have to still be insertable into and removable from the battery receptacle 254 without interference from the housing 214 and/or the handles 230, 234. Although the insertion height H1 is described with respect to the height of the battery, it is understood that the insertion height H1 may apply equally to other dimensions of the battery, such as width or length. As such, the extension of the second handle arms 234*a* away from the first housing portion 242 creates additional space, or clearance, that allows relatively larger batteries to be inserted into and removed from a battery receptacle 254 compared to a handle without the inclined arms 234*a*. In some embodiments, the first handle arms 230*a* of the first handle 230 may extend at an angle relative to the first housing portion 242, alternately or in addition to the second handle arms 234*a*, such that the first handle arms 230*a* extend at least partially away from the second housing portion 246 to provide clearance for a battery to be inserted into and removed from the battery receptacle 254. In some embodiments, one of the handles 230, 234 may additionally include joints and a detent mechanism, similar to the joints 174 and the detent mechanism 176 of FIG. 9, to increase the size of the insertion height H1.

The flood light 210 may be used to illuminate a work area substantially similarly to the flood light 10 of FIG. 1. That is, the flood light 210 may be secured directly on a work surface or in a desired location adjacent to the work area using at least one of the base surface 258*a*, the bottom grip surface 278, the clamp mechanism 226, and/or handles 230, 234. Once the flood light 210 is secured in a desired location, the lighting unit 218 may be adjusted and used substantially similarly as the lighting unit 18 of FIG. 1. The flood light 210 of FIGS. 13-15 advantageously allows for a battery having a height (or other dimension) that is less than the insertion height H1 to be inserted and removed from the battery receptacle 254 without moving or adjusting the position of the handles 230, 234.

Although the disclosure has been described in detail with reference to certain preferred embodiments, variations and modifications exist within the scope and spirit of one or more independent aspects of the disclosure as described. Various features of the present disclosure are set forth in the following claims.

The invention claimed is:

1. A work light comprising:

a housing including a first housing portion and a second housing portion;

a lighting unit coupled to the first housing portion and configured to move relative to the first housing portion;

a battery receptacle coupled to the housing and configured to receive a battery that provides power to the lighting unit for illuminating a work area;

a clamp mechanism configured to secure the work light in a location on or adjacent the work area, the clamp mechanism including a first jaw formed on the first housing portion, a second jaw formed on the second housing portion, and a hinge that biases the first housing portion relative to the second housing portion;

and a handle extending from the first housing portion, the handle graspable to move the first housing portion relative to the second housing portion against a bias of the hinge to open the clamp mechanism, wherein the first jaw includes a first jaw clamping profile having a plurality of first portions, wherein the second jaw includes a second jaw clamping profile having a plurality of second portions, and wherein each of the plurality of first portions is complementary to a corresponding one of the plurality of second portions, and wherein the plurality of first portions includes a first pivot clamp surface that is pivotally supported on the first jaw, and the plurality of second portions includes a second pivot clamp surface that is pivotally supported on the second jaw, and wherein the first pivot clamp surface and second pivot clamp surface are angled with respect to a base surface of the housing when the clamp mechanism is in a closed position.

2. The work light of claim 1, wherein the handle is a first handle, the work light further comprising a second handle that extends from the second housing portion, and wherein a portion the second handle is movable relative to the second housing portion to increase access to the battery receptacle.

3. The work light of claim 2, wherein the portion of the second handle is a grip portion, and wherein the second handle includes a detent mechanism that engages the grip portion to retain the grip portion in an aligned position.

4. The work light of claim 1, wherein the plurality of first portions includes a first large diameter portion that is arcuate, and the plurality of second portions includes a second large diameter portion that is arcuate, and wherein a radius of the first large diameter portion is the same as a radius of the second large diameter portion.

5. The work light of claim 1, wherein the clamp mechanism is movable between the closed position and an open position, and wherein in the closed position at least a portion of the first housing portion and the second housing portion extend parallel to each other.

6. The work light of claim 1, wherein the handle includes a grip portion and an extension portion, and wherein the grip portion is offset from the extension portion in a direction away from the second housing portion.

7. The work light of claim 1, wherein the battery receptacle is positioned between the first housing portion and the second housing portion.

8. The work light of claim 7, wherein the battery receptacle is coupled to the first housing portion on a side opposite the lighting unit.

9. A work light comprising:
- a housing including a first housing portion and a second housing portion;
- a lighting unit coupled to the first housing portion and configured to move relative to the first housing portion;
- a battery receptacle coupled to the housing and configured to receive a battery that provides power to the lighting unit for illuminating a work area;
- a clamp mechanism configured to secure the work light in a location on or adjacent the work area; and
- a handle extending from the second housing portion, at least a portion of the handle extending away from the first housing portion to provide clearance for the battery to be inserted into the battery receptacle,
- wherein the handle includes an extension portion and a grip portion, and wherein the handle extends away from the first housing portion such that the grip portion is further from the first housing portion than the extension portion.

10. The work light of claim 9, wherein the handle is a second handle, the work light further comprising a first handle extending from the first housing portion, and wherein the first handle and the second handle are graspable to operate the clamp mechanism to secure the work light in the location on or adjacent to the work area.

11. The work light of claim 10, wherein the battery receptacle defines an insertion direction for receiving the battery, and wherein the first handle extends in a direction parallel to the insertion direction of the battery.

12. The work light of claim 11, wherein the second housing portion includes a base surface for supporting the housing on a support surface, and wherein the base surface is inclined with respect to the insertion direction of the battery.

13. The work light of claim 12, wherein the base surface includes a plurality of magnets configured to magnetically attach the housing to a support surface.

14. The work light of claim 9, wherein the battery receptacle is coupled to the first housing portion on a side opposite the lighting unit and is disposed between the first housing portion and the second housing portion.

15. The work light of claim 9, wherein the lighting unit is pivotable relative to the housing about a first axis and rotatable relative to the housing about a second axis.

16. The work light of claim 15, wherein the first housing portion includes a lighting unit receptacle, and wherein the lighting unit is movable to a storage configuration in which the lighting unit is at least partially received in the lighting unit receptacle.

17. A work light comprising:
- a housing including a first housing portion and a second housing portion;
- a lighting unit coupled to the first housing portion and configured to move relative to the first housing portion;
- a battery receptacle coupled to the housing and configured to receive a battery that provides power to the lighting unit for illuminating a work area;
- a clamp mechanism configured to secure the work light in a location on or adjacent the work area; and
- a handle extending from the second housing portion, at least a portion of the handle extending away from the first housing portion to provide clearance for the battery to be inserted into the battery receptacle,
- wherein the lighting unit is pivotable relative to the housing about a first axis and rotatable relative to the housing about a second axis, and
- wherein the first housing portion includes a lighting unit receptacle, and wherein the lighting unit is movable to a storage configuration in which the lighting unit is at least partially received in the lighting unit receptacle.

18. A work light comprising:
- a housing including a first housing portion and a second housing portion;
- a lighting unit coupled to the first housing portion and configured to move relative to the first housing portion;
- a battery receptacle coupled to the housing and configured to receive a battery that provides power to the lighting unit for illuminating a work area;
- a clamp mechanism configured to secure the work light in a location on or adjacent the work area, the clamp mechanism including
  - a first jaw formed on the first housing portion,
  - a second jaw formed on the second housing portion, and
  - a hinge that biases the first housing portion relative to the second housing portion;

and
- a handle extending from the first housing portion, the handle graspable to move the first housing portion relative to the second housing portion against a bias of the hinge to open the clamp mechanism,
- wherein the handle is a first handle, the work light further comprising a second handle that extends from the second housing portion, and wherein a portion the second handle is movable relative to the second housing portion to increase access to the battery receptacle.

* * * * *